United States Patent
Malladi et al.

(10) Patent No.: US 9,398,552 B2
(45) Date of Patent: Jul. 19, 2016

(54) BEACON ASSISTED CELL SEARCH IN A WIRELESS COMMUNICATION SYSTEM

(71) Applicant: QUALCOMM INCORPORATED, San Diego, CA (US)

(72) Inventors: Durga Prasad Malladi, San Diego, CA (US); Juan Montojo, Nuremberg (DE); Junyi Li, Chester, NJ (US); Byoung-Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/158,037

(22) Filed: Jan. 17, 2014

(65) Prior Publication Data

US 2014/0133478 A1 May 15, 2014

Related U.S. Application Data

(62) Division of application No. 11/853,704, filed on Sep. 11, 2007, now Pat. No. 8,665,799.

(60) Provisional application No. 60/845,268, filed on Sep. 14, 2006, provisional application No. 60/828,051, filed on Oct. 3, 2006.

(51) Int. Cl.
*H04W 56/00* (2009.01)
*H04L 5/00* (2006.01)
(Continued)

(52) U.S. Cl.
CPC ............. *H04W 56/001* (2013.01); *H04B 1/713* (2013.01); *H04J 11/0069* (2013.01);
(Continued)

(58) Field of Classification Search
None
See application file for complete search history.

(56) References Cited

U.S. PATENT DOCUMENTS

| 5,418,571 A | 5/1995 | Ghanbari |
| 6,728,540 B1 | 4/2004 | DeSantis et al. |

(Continued)

FOREIGN PATENT DOCUMENTS

| CN | 1274250 A | 11/2000 |
| CN | 1278375 A | 12/2000 |

(Continued)

OTHER PUBLICATIONS

"3GPP TR 25.814 V7.1.0, Technical Report, 3rd Generation Partnership Project; Technical Specification Group Radio Access Network; Physical layer aspects for evolved Universal Terrestrial Radio Access (UTRA) (Release 7)" Sep. 1, 2006, XP002511692 Retrieved from the Internet: URL:http://www.3gpp.org/ftp/Specs/archive/25_series/25.814/25814-710.zip>; [retrieved on Jan. 22, 2009].

(Continued)

*Primary Examiner* — Hassan Phillips
*Assistant Examiner* — Saba Tsegaye

(57) ABSTRACT

Techniques for transmitting synchronization signals to assist user equipments (UEs) perform cell searches are described. In one design, a base station for a cell may generate and transmit a primary synchronization signal and a secondary synchronization signal, which may be used by the UEs for initial cell search at power up. The base station may also generate and transmit one or more beacon signals, which may be used by the UEs for neighbor cell search to detect for neighbor cells. The number of beacon signals to transmit and the set of subcarriers usable for each beacon signal may be determined based on the system bandwidth. Each beacon signal may be mapped to one subcarrier in the set of subcarriers in each beacon symbol period. This one subcarrier may be determined based on a beacon hopping pattern or a beacon code and may be dependent on a cell identifier (ID).

32 Claims, 15 Drawing Sheets

(51) Int. Cl.
*H04B 1/713* (2011.01)
*H04J 11/00* (2006.01)
*H04W 48/16* (2009.01)
*H04L 27/26* (2006.01)
*H04W 48/12* (2009.01)

(52) U.S. Cl.
CPC ........... *H04L 5/0048* (2013.01); *H04L 5/0053* (2013.01); *H04L 5/0064* (2013.01); *H04W 48/16* (2013.01); *H04L 5/0023* (2013.01); *H04L 27/2656* (2013.01); *H04W 48/12* (2013.01)

(56) References Cited

U.S. PATENT DOCUMENTS

| | | | |
|---|---|---|---|
| 6,729,540 | B2 | 5/2004 | Ogawa |
| 6,741,578 | B1 | 5/2004 | Moon et al. |
| 6,834,046 | B1 | 12/2004 | Hosur et al. |
| 6,968,194 | B2 | 11/2005 | Aljadeff et al. |
| 6,985,498 | B2 | 1/2006 | Laroia et al. |
| 6,993,333 | B2 | 1/2006 | Laroia et al. |
| 7,092,353 | B2 | 8/2006 | Laroia et al. |
| 7,508,842 | B2 | 3/2009 | Baum et al. |
| 7,941,173 | B2 | 5/2011 | Laroia et al. |
| 8,018,930 | B2 | 9/2011 | Casaccia et al. |
| 8,509,267 | B2 | 8/2013 | Kim et al. |
| 2004/0037261 | A1* | 2/2004 | Suzuki ............................ 370/342 |
| 2004/0228269 | A1 | 11/2004 | Balakrishnan et al. |
| 2005/0030967 | A1 | 2/2005 | Ohmi et al. |
| 2005/0032534 | A1 | 2/2005 | Yoshizawa et al. |
| 2005/0153695 | A1 | 7/2005 | Cho |
| 2005/0176371 | A1* | 8/2005 | Palin et al. .................... 455/41.2 |
| 2005/0250469 | A1 | 11/2005 | Laroia et al. |
| 2006/0057994 | A1 | 3/2006 | Anand |
| 2006/0155533 | A1 | 7/2006 | Lin et al. |
| 2006/0161432 | A1 | 7/2006 | Zhang et al. |
| 2007/0002811 | A1 | 1/2007 | Faccin et al. |
| 2007/0091785 | A1* | 4/2007 | Lindoff et al. .................. 370/203 |
| 2007/0202902 | A1* | 8/2007 | Jansen et al. ................... 455/502 |
| 2007/0263743 | A1 | 11/2007 | Lee et al. |
| 2007/0291636 | A1* | 12/2007 | Rajagopal et al. ............ 370/208 |
| 2008/0095108 | A1 | 4/2008 | Malladi et al. |
| 2009/0135803 | A1* | 5/2009 | Luo et al. ...................... 370/350 |
| 2013/0279448 | A1 | 10/2013 | Kim et al. |

FOREIGN PATENT DOCUMENTS

| | | |
|---|---|---|
| EP | 1463216 A2 | 9/2004 |
| JP | 2005525725 | 8/2005 |
| JP | 2007529157 T | 10/2007 |
| KR | 10369791 | 1/2003 |
| RU | 2120702 C1 | 10/1998 |
| RU | 2202149 C2 | 4/2003 |
| RU | 2280329 C1 | 7/2006 |
| WO | 0067399 A1 | 11/2000 |
| WO | 0211331 A2 | 2/2002 |
| WO | 2005038606 A2 | 4/2005 |
| WO | 2005039094 | 4/2005 |
| WO | 2006018710 A1 | 2/2006 |
| WO | 2006039681 | 4/2006 |
| WO | 2006044661 A2 | 4/2006 |

OTHER PUBLICATIONS

3GPP TS 36.211 v0.1.0; "3rd Generation Partnership Project; Technical Specification Group Radio Access Network; Physical Channels and Modulation," 3GPP TS 36.211 version 0.1.0, Release 8, Oct. 2006.
3GPP TS 36.212 v0.1.0; "3rd Generation Partnership Project; Technical Specification Group Radio Access Network; Multiplexing and channel coding," 3GPP TS 36.212 version 0.1.0, Release 8, Oct. 2006.
3GPP TS 36.213 v0.1.0; "3rd Generation Partnership Project; Technical Specification Group Radio Access Network; Physical layer procedures," 3GPP TS 36.213 version 0.1.0, Release 8, Oct. 2006.
3GPP TSG RAN WG1 #46; "Hierarchical SCH design," 3GPP R1-062289, Tallinn, Estonia, Aug. 28-Sep. 1, 2006.
3GPP TSG RAN WG1 Meeting #43; "Cell Search procedure for initial synchronization and neighbour cell identification," 3GPP R1-051549, Seoul, Korea, Nov. 7-11, 2005.
3GPP TSG RAN1 #46-bis; "Neighbor Cell Search-Structure and Simulations," 3GPP R1-062692, Seoul, Korea, Oct. 9-13, 2006.
3GPP TSG-RAN WG1 #46: "SCH Structure for E-UTRA", vol. R1-062037, Aug. 28, 2006, pp. 1-5, Tallinn, Estonia.
3GPP TSG-RAN WG1 Meeting #46: "Multiplexing Method of SCH for E-UTRA Downlink",R1-062094, Aug. 28-Sep. 2006, pp. 1-9, XP002476390, Tallinn, Estonia.
El Gamal, H. et al., "Universal Space-Time Coding," IEEE Transactions on Information Theory, vol. 49, Issue 5, pp. 1097-1119, XP011074756, ISSN: 0018-9448, May 2003.
European Search Report—EP12161237—Search Authority—Munich—Apr. 25, 2012.
European Search Report—EP12161715—Search Authority—Munich—Jun. 21, 2012.
International Search Report—PCT/US2007/078369, International Searching Authority—European Patent Office—Jul. 4, 2008.
Partial International Search Report—PCT/US2007/078369, International Searching Authority—European Patent Office—Apr. 15, 2008.
Samanta, et al, "Codebook Adaptation for Quantized MIMO Beamforming Systems," Conference Record of the Thirty-Ninth Asilomar Conference on Signals, Systems and Computers, 2005, pp. 376-380, XP010900022, ISBN: 978-1-4244-0131-4, Oct. 28-Nov. 1, 2005.
Taiwan Search Report—TW096134641—TIPO—Apr. 7, 2011.
Written Opinion—PCT/US2007/078369, International Searching Authority—European Patent Office—Jul. 4, 2008.

* cited by examiner

PSC = Primary synchronization signal
SSC = Secondary synchronization signal
BSC = Beacon signal PSC = Primary synchronization signal
SSC = Secondary synchronization signal
BSC = Beacon signal

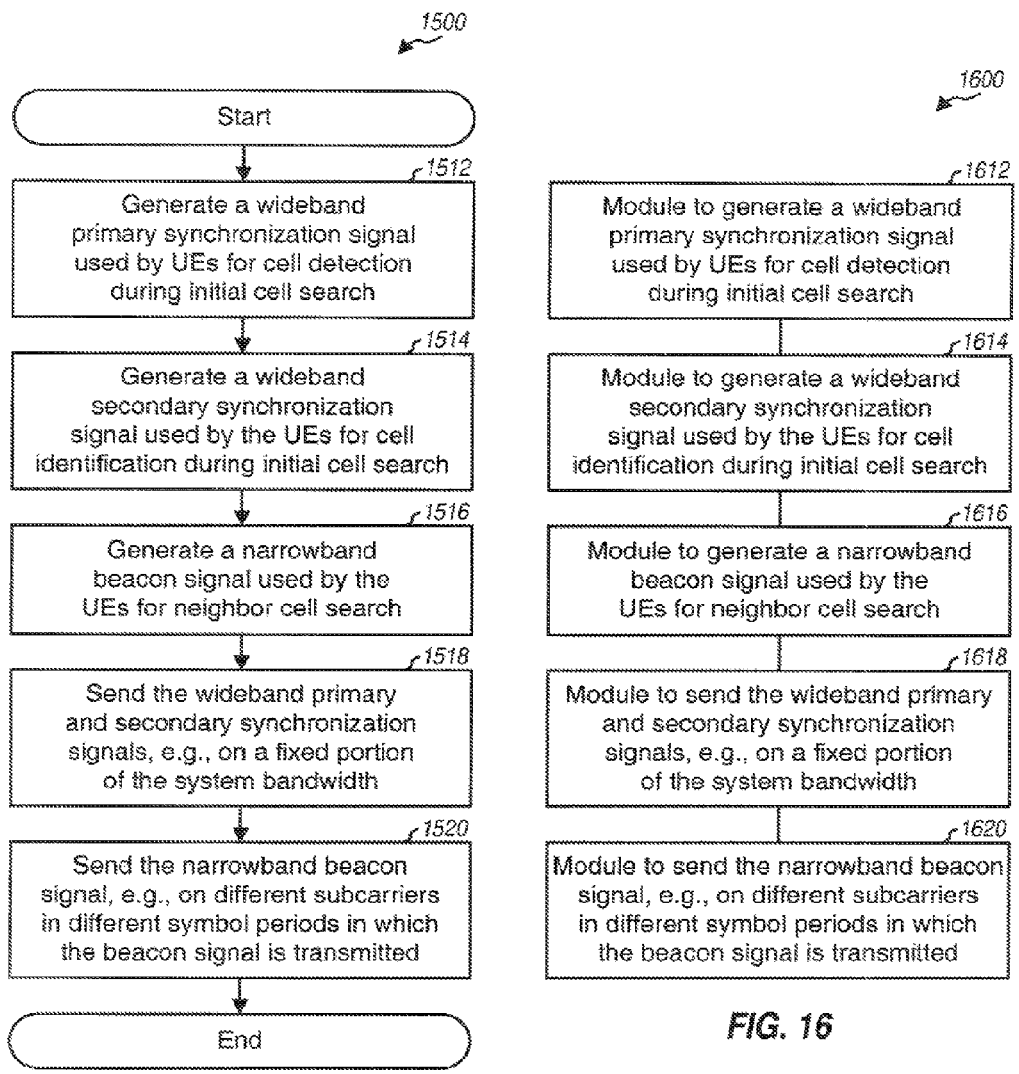

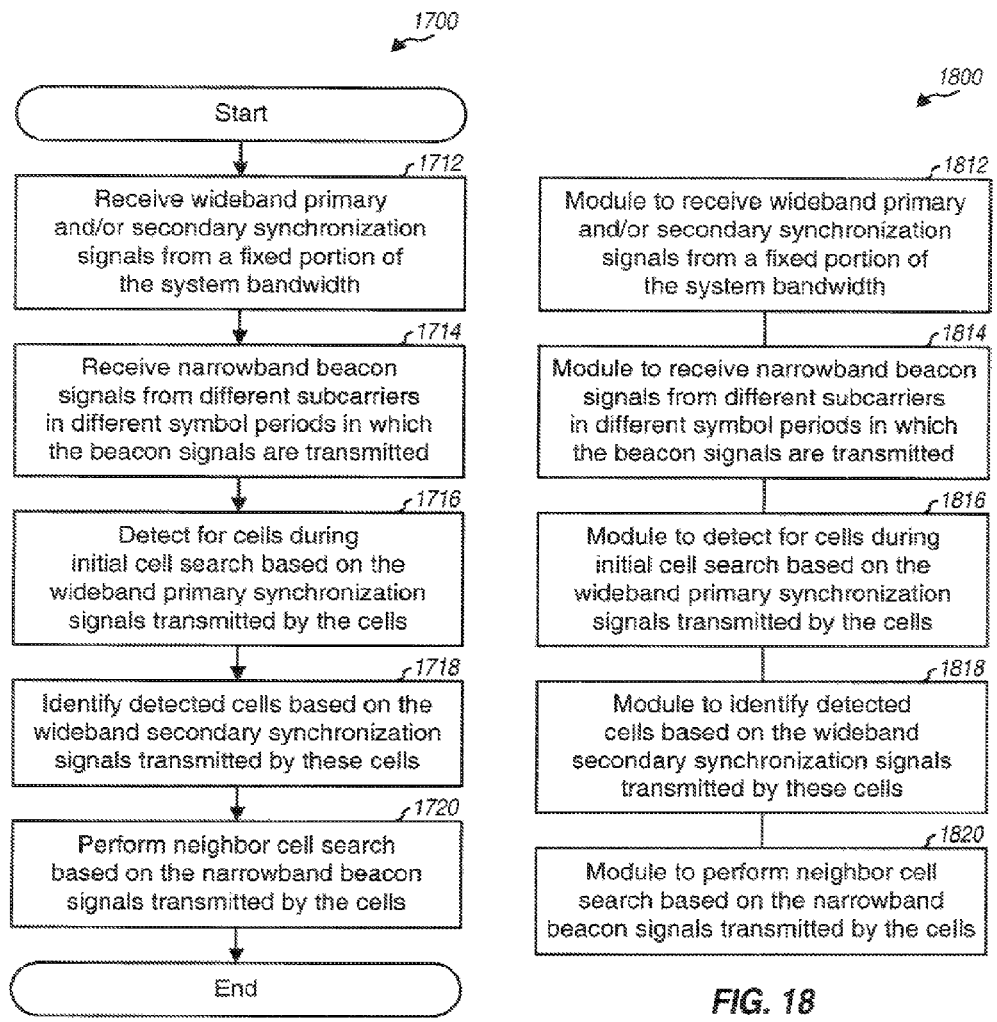

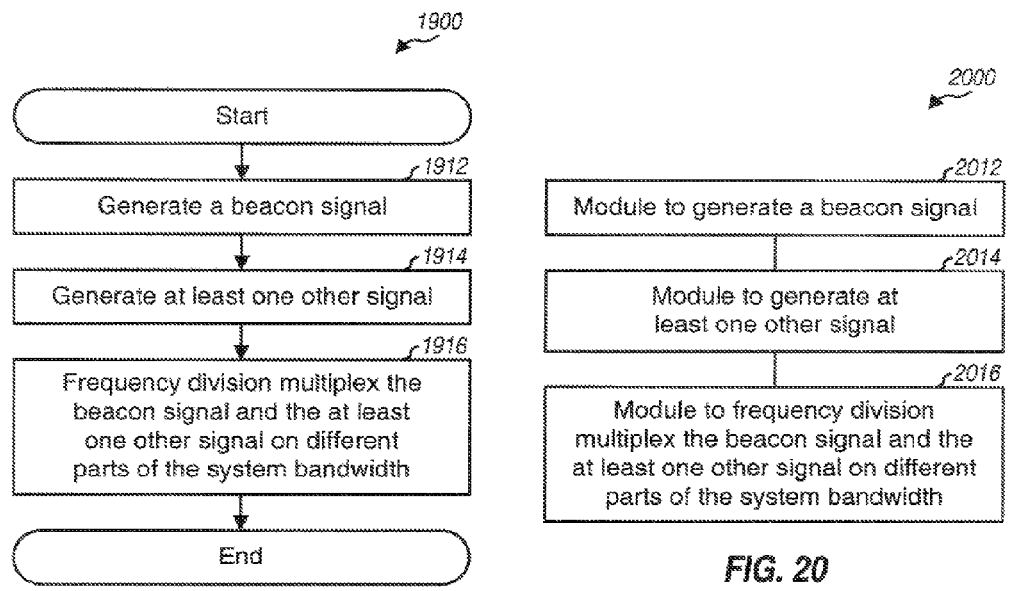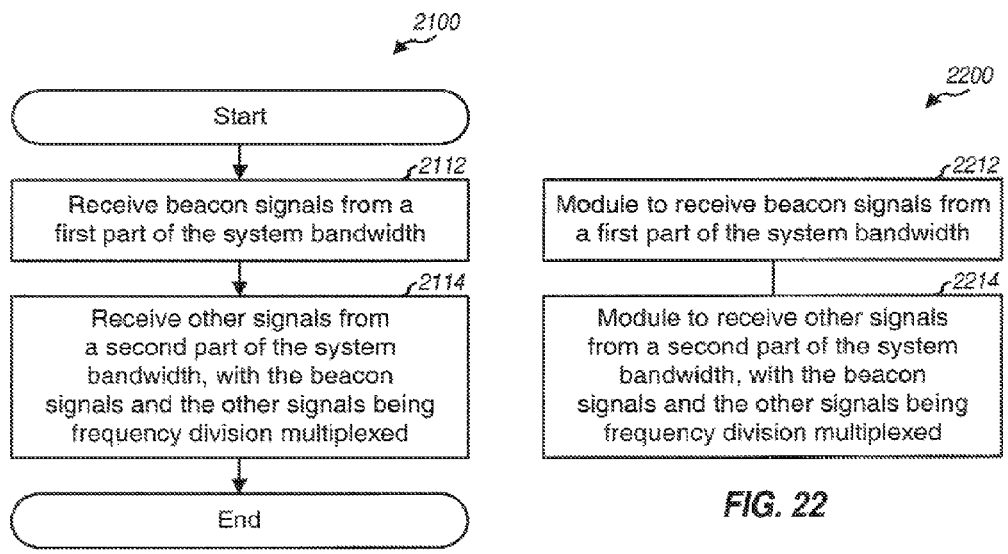

BEACON ASSISTED CELL SEARCH IN A WIRELESS COMMUNICATION SYSTEM

This application is a divisional of U.S. Pat. No. 8,665,799, filed Sep. 11, 2007, and entitled "BEACON ASSISTED CELL SEARCH IN A WIRELESS COMMUNICATION SYSTEM," which claims the benefit of U.S. Provisional Application Ser. No. 60/845,268, entitled "A METHOD AND APPARATUS FOR USING SCALABLE BEACON SIGNALING BASED ON SYSTEM BANDWIDTH," filed Sep. 14, 2006, and also claims the benefit of U.S. Provisional Application Ser. No. 60/828,051, entitled "A METHOD AND APPARATUS FOR P-SCH FOR E-UTRA," filed Oct. 3, 2006, both assigned to the assignee hereof and incorporated herein by reference.

BACKGROUND

I. Field

The present disclosure relates generally to communication, and more specifically to techniques for searching for cells in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). A UE (e.g., a cellular phone) may be within the coverage of zero, one, or multiple base stations at any given moment. The UE may have just been powered on or may have lost coverage and thus may not know which base stations can be received. The UE may perform cell search to detect for base stations and to acquire timing and other information for the detected base stations. The UE may also be in communication with one or more base stations and may be mobile. The UE may perform cell search to detect for better base stations to serve the UE.

Each base station may transmit synchronization signals to assist the UEs perform cell search. In general, a synchronization signal may be any signal that allows a receiver to detect for a transmitter and to obtain information, e.g., timing and identity, of the transmitter. The synchronization signals represent overhead and should be transmitted as efficiently as possible. Furthermore, the synchronization signals should allow the UEs to perform cell search as quickly and efficiently as possible.

SUMMARY

Techniques for transmitting synchronization signals to assist UEs perform cell searches are described herein. In one design, a base station for a cell may generate and transmit a primary synchronization signal and a secondary synchronization signal, which may be used by the UEs for initial cell search at power up. The base station may also generate and transmit one or more beacon signals, which may be used by the UEs for neighbor cell search to detect for neighbor cells while the UEs are in idle and active states. A beacon signal is a signal in which all or a large fraction of the total cell transmit power is used for one or few subcarriers. The number of beacon signals to transmit and the set of subcarriers usable for each beacon signal may be determined based on the system bandwidth. In one design, each beacon signal may be mapped to one subcarrier (which is referred to as a beacon subcarrier) in the set of subcarriers in each symbol period in which the beacon signal is transmitted. The beacon subcarrier may be determined based on a beacon hopping pattern or a beacon code and may be dependent on a cell identifier (ID) and/or other information being sent in the beacon signal. The beacon signal(s) may be sent with time division multiplexing (TDM) or frequency division multiplexing (FDM).

In one design, a UE may perform initial cell search based on the primary and secondary synchronization signals transmitted by the cells in the system. The UE may determine the system bandwidth, e.g., based on system information received from a detected cell. The UE may determine a set of subcarriers usable for beacon signals based on the system bandwidth. While operating in the idle or active state, the UE may periodically perform neighbor cell search to detect for beacon signals from neighbor cells based on the set of subcarriers.

Various aspects and features of the disclosure are described in further detail below.

BRIEF DESCRIPTION OF THE DRAWINGS

FIG. 15 shows a process for synchronization signal transmission by the Node B.
FIG. 16 shows an apparatus for synchronization signal transmission.
FIG. 17 shows a process for performing cell searches by the UE.
FIG. 18 shows an apparatus for performing cell searches.
FIG. 19 shows a process for FDM beacon transmission by the Node B.
FIG. 20 shows an apparatus for FDM beacon transmission.
FIG. 21 shows a process for FDM beacon reception by the UE.
FIG. 22 shows an apparatus for FDM beacon reception.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. The spacing between adjacent subcarriers may be fixed, and the total number of subcarriers (K) may be dependent on the system bandwidth. Each subcarrier may be modulated with data. In general, modulation symbols are sent in the frequency domain with OFDM and in the time domain with SC-FDM. To generate an OFDM symbol, symbols with non-zero values may be mapped to subcarriers used for transmission, and symbols with zero values may be mapped to remaining subcarriers. The K symbols may be transformed to the time domain to obtain K time-domain samples. The last C samples may be copied and appended to the front of the K samples to obtain an OFDM symbol containing K+C samples. The copied samples are referred to as a cyclic prefix, and C is the cyclic prefix length.

Figure 1:
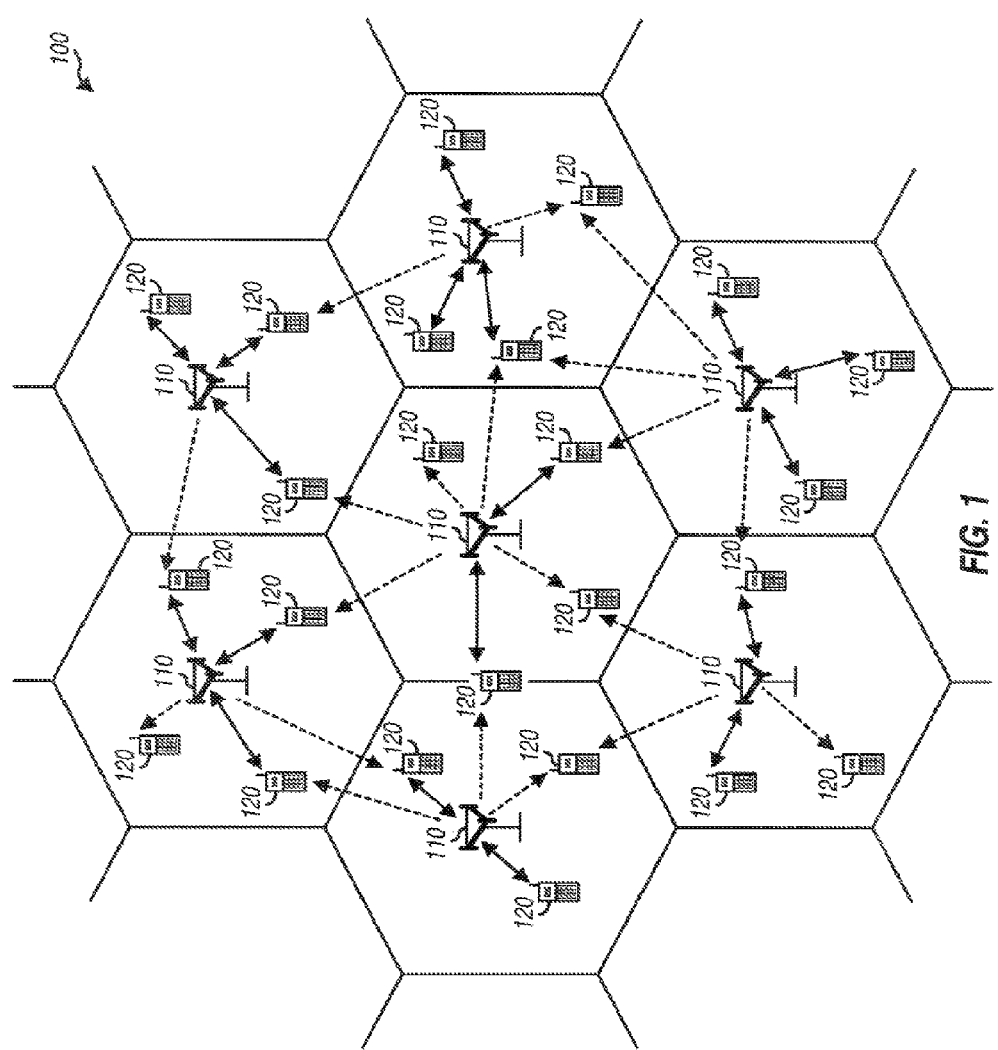
FIG. 1 shows a wireless communication system.

FIG. 1 shows a wireless communication system 100 with multiple Node Bs 110. A Node B may be a fixed station used for communicating with the UEs and may also be referred to as an evolved Node B (eNB), a base station, an access point, etc. Each Node B 110 provides communication coverage for a particular geographic area. The overall coverage area of each Node B 110 may be partitioned into multiple (e.g., three) smaller areas. In 3GPP, the term "cell" can refer to the smallest coverage area of a Node B and/or a Node B subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates communication between a Node B and a UE. A broken line with a single arrow indicates a UE receiving a downlink signal from a Node B. A UE may perform cell search based on the downlink signals transmitted by the Node Bs.

In system 100, Node Bs 110 may periodically transmit synchronization signals to allow UEs 120 to detect for the Node Bs and to obtain information such as timing, frequency offset, cell ID, etc. Table 1 lists three types of synchronization signals that may be transmitted by a Node B and provides a short description for each type of synchronization signal.

TABLE 1

| Symbol | Synchronization signal | Description |
|---|---|---|
| PSC | Primary synchronization signal | A synchronization signal used for cell detection during initial cell search. |
| SSC | Secondary synchronization signal | A synchronization signal used for cell identification during initial cell search. |
| BSC | Beacon signal | A synchronization signal used for neighbor cell search to detect for neighbor cells. |

A primary synchronization signal may be generated based on a primary synchronization code (PSC) sequence, sent on a primary synchronization channel (P-SCH), and referred to as a PSC signal. The PSC sequence may be a CAZAC (constant amplitude zero auto correlation) sequence, a pseudo-random number (PN) sequence, etc. Some example CAZAC sequences include a Chu sequence, a Zadoff-Chu sequence, a Frank sequence, a generalized chirp-like (GCL) sequence, etc. A secondary synchronization signal may be generated based on a secondary synchronization code (SSC) sequence, sent on a secondary synchronization channel (S-SCH), and referred to as an SSC signal. The SSC sequence may be a maximum-length sequence (M-sequence), a PN sequence, a binary sequence, etc. A beacon signal may be generated based on a beacon code or a beacon hopping pattern and sent on a beacon synchronization channel (B-SCH). The primary synchronization signal, secondary synchronization signal, and beacon signal may also be referred to as simply PSC, SSC and BSC, respectively. The beacon signal may also be referred to as a beacon synchronization signal, a beacon, a BSC signal, etc.

The PSC and SSC for E-UTRA may be generated as described in 3GPP TS 36.211, entitled "Physical Channels and Modulation," June 2007. The PSC and SSC for UTRA may be generated as described in 3GPP TS 25.213, entitled "Spreading and modulation," May 2007. 3GPP documents are publicly available. The PSC and SSC may also be generated in other manners, e.g., as described in the aforementioned provisional U.S. Application Ser. No. 60/828,051. The BSC may be generated and transmitted as described below.

The BSC may be transmitted with TDM or FDM. For a TDM design, the BSC may occupy the entire system bandwidth in each symbol period in which the BSC is transmitted. For an FDM design, the BSC may occupy a portion of the system bandwidth in each symbol period in which the BSC is transmitted.

Figure 2:
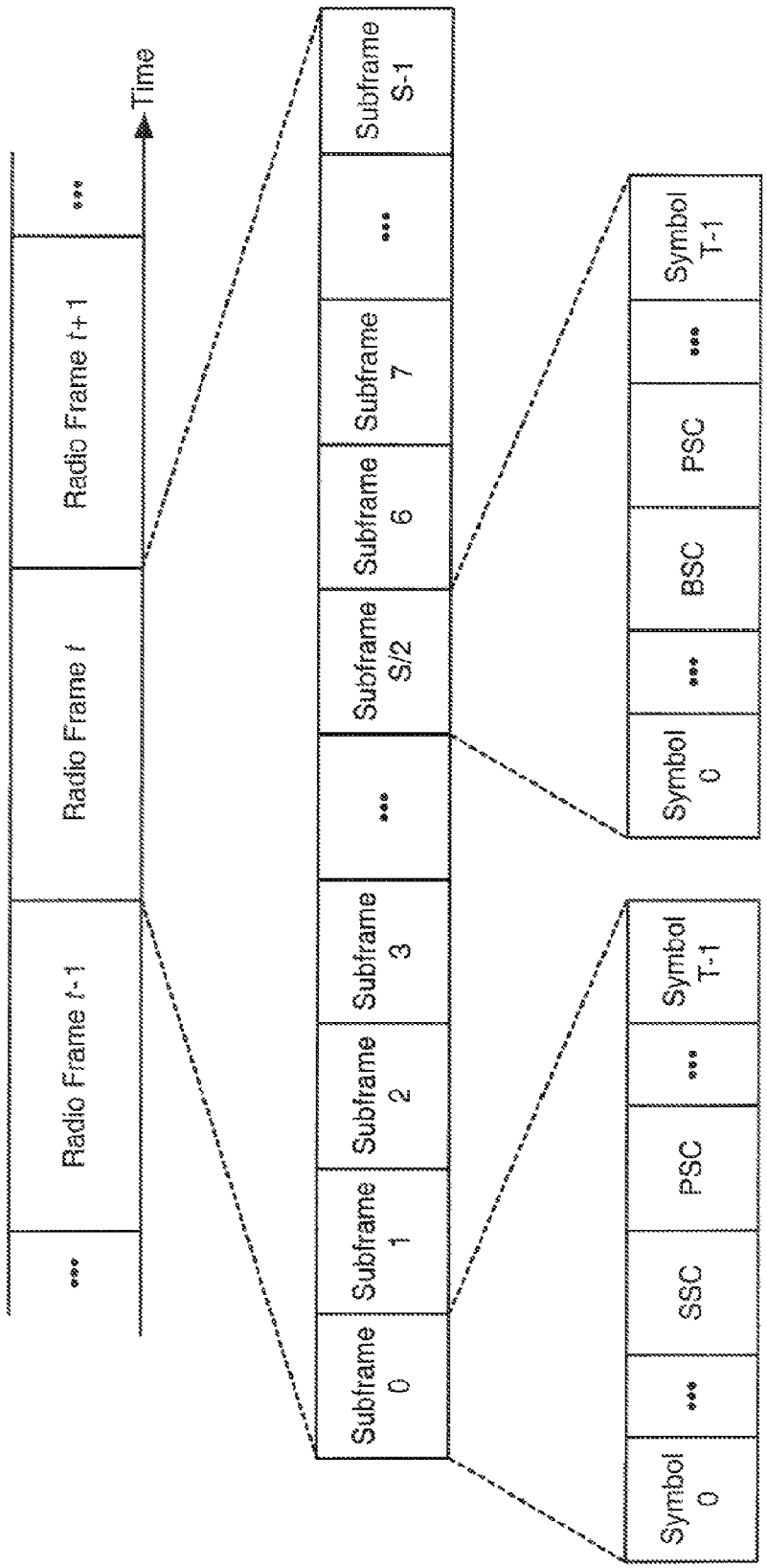
FIG. 2 shows synchronization signal transmission for a TDM design.

FIG. 2 shows example transmission of the three synchronization signals in Table 1 in accordance with a TDM design. The transmission timeline for the downlink may be partitioned into units of radio frames. Each radio frame may be further partitioned into multiple (S) subframes, and each subframe may include multiple (T) symbol periods. In one design, each radio frame has a duration of 10 milliseconds (ms) and is partitioned into S=10 subframes, each subframe has a duration of 1 ms and is partitioned into two slots, and each slot covers 6 or 7 symbol periods depending on the cyclic prefix length. The radio frames may also be partitioned in other manners.

In one design, the PSC is transmitted in the last symbol of the first slot in each of subframes 0 and 5, which are at the start and middle of a radio frame. The SSC is transmitted just before the PSC in subframe 0, and the BSC is transmitted just before the PSC in subframe 5. In general, the PSC, SSC and BSC may each be transmitted at any rate (e.g., any number of times in each radio frame) and may be transmitted at the same or different rates. The SSC may be sent near the PSC so that a channel estimate may be derived based on the PSC and used for coherent detection of the SSC. The BSC may be sent at any known location in a radio frame.

In one design, all cells in the system may transmit the same PSC sequence to allow the UEs to detect for the presence of these cells. Different cells may transmit different SSC sequences to allow the UEs to identify these cells. Different cells may also transmit the BSC using different beacon hopping patterns to allow the UEs to identify these cells.

A UE may operate in one of several states such as LTE Detached, LTE Idle and LTE Active states. In the LTE Detached state, the UE has not accessed the system and is not known by the system. The UE may power up in the LTE Detached state and may thereafter transition to the LTE Idle state or LTE Active state upon accessing the system and performing registration. In the LTE Idle state, the UE may have registered with the system but may be idle and not have any data to exchange on the downlink or uplink. In the LTE Idle state, the UE and the system may have pertinent context information to allow the UE to quickly transition to the LTE Active state. The UE may transition to the LTE Active state when there is data to send or receive. In the LTE Active state, the UE may actively communicate with the system on the downlink and/or uplink.

The UE may perform initial cell search, e.g., in the LTE Detached state at power up, using a three-stage process. In one design, the three-stage process may include:
1. PSC detection stage
   a. Detect for cells based on the PSC transmitted by the cells,
   b. Obtain symbol timing for each detected cell, and
   c. Estimate frequency offset and channel response for each detected cell;
2. SSC detection stage
   a. Obtain frame timing for each detected cell, and
   b. Identify each detected cell based on the SSC transmitted by the cell; and
3. Broadcast channel (BCH) demodulation stage
   a. Obtain system bandwidth, cyclic prefix length, and other system information from the BCH of a detected cell.

For the PSC detection stage, the symbol and frame timing may be unknown, so the UE may correlate a received signal with a locally generated PSC sequence at different timing hypotheses (or time offsets) in order to detect for PSC sequences transmitted by the cells. For the SSC detection stage, the symbol timing may be known from the PSC detection stage, but there may be many SSC hypotheses (e.g., cell IDs) to test. The UE may correlate the received signal with different possible SSC sequences in order to detect for the SSC sequence transmitted by each cell detected by the PSC detection stage.

After the initial cell search, one cell may be selected to serve the UE. The UE may communicate with this serving cell in the LTE Active state or may camp on this cell in the LTE Idle state.

The UE may perform neighbor cell search, e.g., while in the LTE Idle state or LTE Active state, to look for better cells than the current serving cell. For the neighbor cell search, the UE may already have certain information such as the system bandwidth, symbol and frame timing, and cyclic prefix length. In one design, the UE may search for neighbor cells by correlating the received signal with different possible SSC sequences in the same manner as for the initial cell search. However, continual neighbor cell search based on correlation may consume excessive battery power at the UE. The initial cell search may be performed only once at power up, and high battery power consumption for a short period of time may be acceptable. The UE may continually perform neighbor cell search while it is powered on. Hence, low search complexity may be highly desirable for neighbor cell search in order to reduce battery power consumption.

In an aspect, neighbor cell search may be performed based on beacon signals transmitted by the cells. A beacon signal includes high power narrowband signal components (e.g., on one or few subcarriers) that may be much higher in power compared to other signals such as user data signals. The beacon signal may be composed of a sequence of beacon symbols. In one design, a beacon symbol for one beacon signal is an OFDM symbol in which all or a large fraction of the total cell transmit power is used for one subcarrier. In other designs, a beacon symbol may have all or a large fraction of the total cell transmit power on a small number of subcarriers. For clarity, the following description is for the design in which a beacon signal uses one subcarrier in each symbol period in which the beacon signal is transmitted. Since a large amount of energy is transmitted on just one subcarrier, a beacon signal can be reliably detected even at low signal-to-noise ratio (SNR).

In one design, the neighbor cell search may include:
1. Beacon detection
   a. Detect for candidate subcarriers with high received signal quality, and
   b. Identify neighbor cells based on the candidate subcarriers.

After detecting a neighbor cell, the UE may measure the downlink channel quality for the neighbor cell based on a pilot channel transmitted by the cell. The UE may report downlink channel qualities for all detected neighbor cells to the system, which may make handover decisions for the UE based on the report.

The system may have a configurable system bandwidth, which may be selected from a set of possible system bandwidths. In one design, the possible system bandwidths include 1.25, 2.5, 5, 7.5, 10, 15 and 20 MHz. Other possible system bandwidths may also be supported. The UEs may also have different capabilities, which may be characterized by the bandwidths supported by these UEs. In one design, the UEs are assumed to support a minimum bandwidth of 10 MHz.

In one design, the number of beacon signals to transmit by a cell may be configurable and determined based on the system bandwidth and the UE bandwidth capability. In general, the cell may transmit a sufficient number of beacon signals within the system bandwidth such that a UE with the minimum bandwidth capability can receive at least one beacon signal from the cell.

Figure 3A:
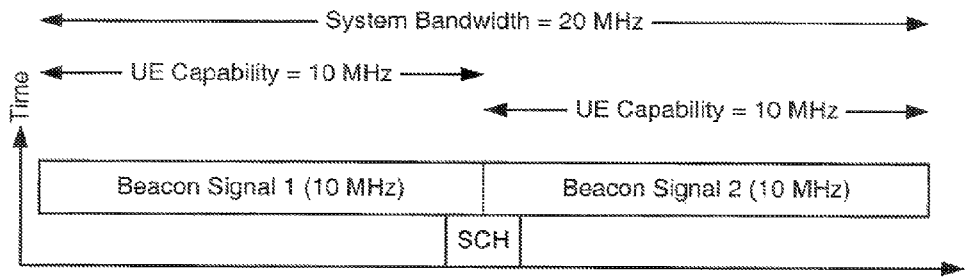
FIGS. 3A-3C show TDM beacon transmission for different system bandwidths.

FIG. 3A shows a design of TDM beacon transmission for a system bandwidth of 20 MHz. In this design, the system bandwidth may be partitioned into a 10 MHz left half and a 10

MHz right half. One beacon signal may be transmitted in the left half, another beacon signal may be transmitted in the right half, and each beacon signal may cover 10 MHz. The PSC and SSC may be transmitted in the center 1.25 MHz of the system bandwidth. A 10 MHz capable UE may operate in either the left or right half of the system bandwidth and would then be able to receive one of the two beacon signals.

Figure 3B:
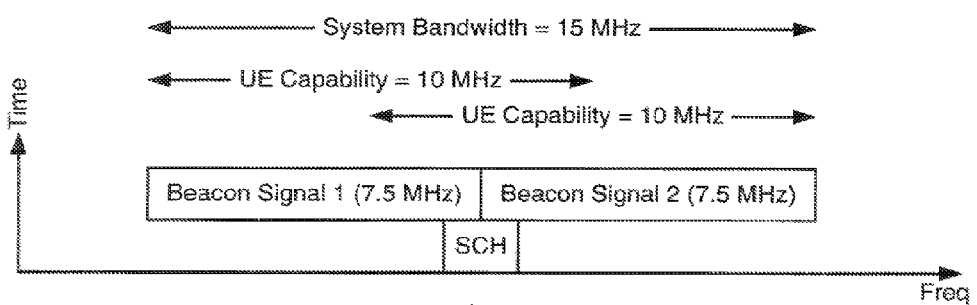

FIG. 3B shows a design of TDM beacon transmission for a system bandwidth of 15 MHz. In this design, the system bandwidth may be partitioned into a 7.5 MHz left half and a 7.5 MHz right half. One beacon signal may be transmitted in each half, and each beacon signal may cover 7.5 MHz. The PSC and SSC may be transmitted in the center of the system bandwidth. A 10 MHz capable UE may operate over the left or right half of the system bandwidth.

When multiple beacon signals are transmitted, e.g., as shown in FIGS. 3A and 3B, the same or different beacon signals may be transmitted on different parts of the system bandwidth. However, transmitting the same beacon signal may simplify operation.

Figure 3C:
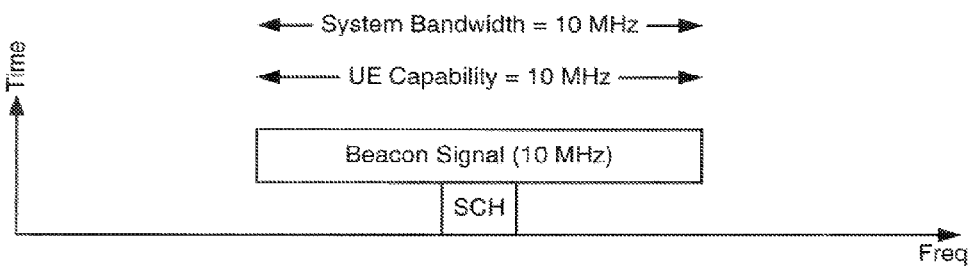

FIG. 3C shows a design of TDM beacon transmission for a system bandwidth of 10 MHz. In this design, one beacon signal may be transmitted across the entire system bandwidth and may cover 10 MHz. The PSC and SSC may be transmitted in the center of the system bandwidth. A 10 MHz capable UE may operate over the entire system bandwidth.

TDM beacon transmission for system bandwidths of 7.5, 5, 2.5 and 1.25 MHz may be similar to TDM beacon transmission for system bandwidth of 10 MHz. For each system bandwidth that is equal to or smaller than the UE bandwidth capability, one beacon signal may be transmitted across the entire system bandwidth.

Figure 4:
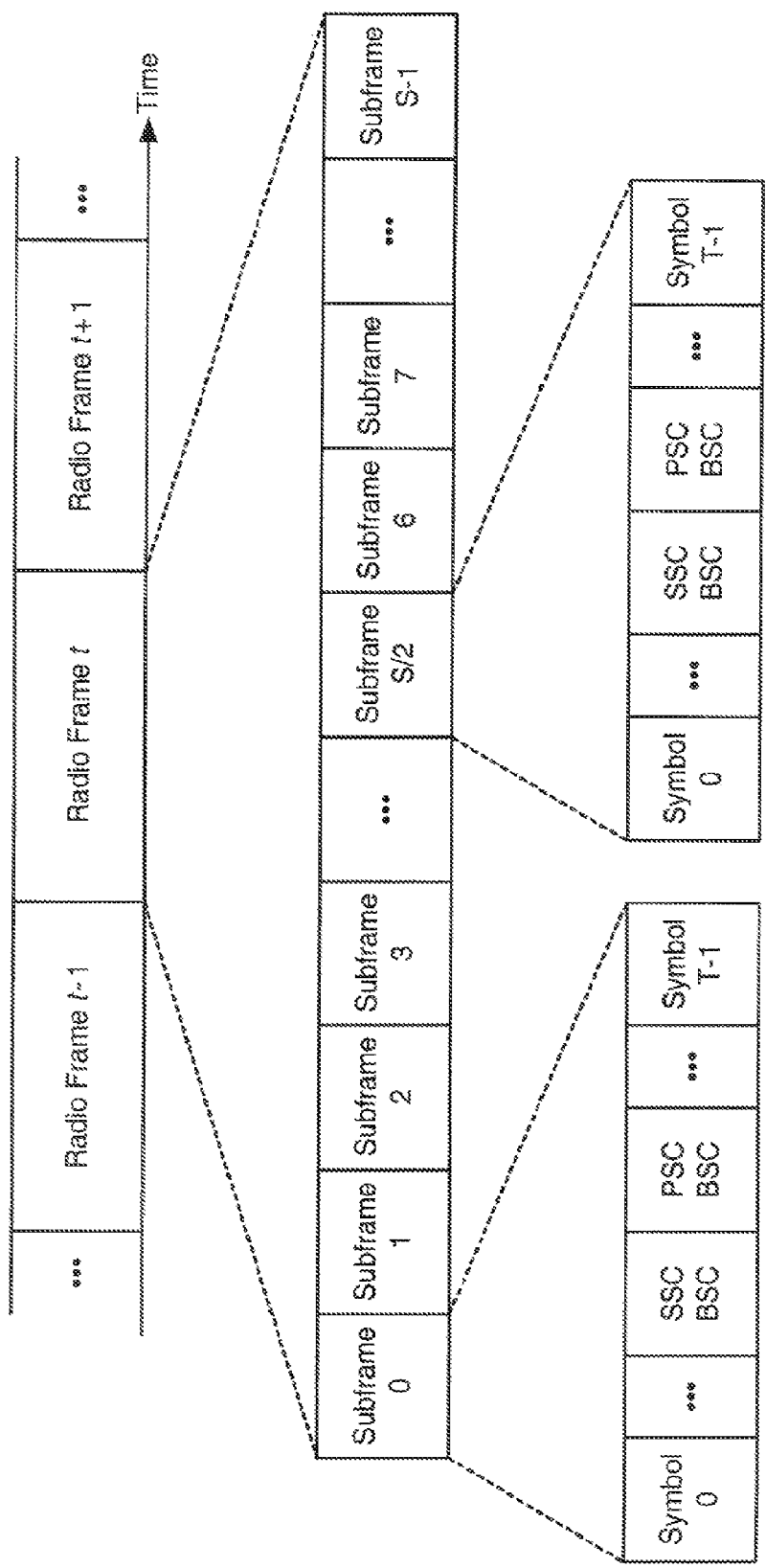
FIG. 4 shows synchronization signal transmission for an FDM design.

FIG. 4 shows example transmission of the three synchronization signals in Table 1 in accordance with an FDM design. In one design, a radio frame includes 10 subframes, the PSC is transmitted in each of subframes 0 and 5, and the SSC is transmitted just before the PSC. The BSC may be transmitted with the PSC and also with the SSC, as shown in FIG. 4. Alternatively, the BSC may be transmitted only with the PSC or only with the SSC. In general, the PSC, SSC and BSC may each be transmitted at any rate.

Figure 5A:
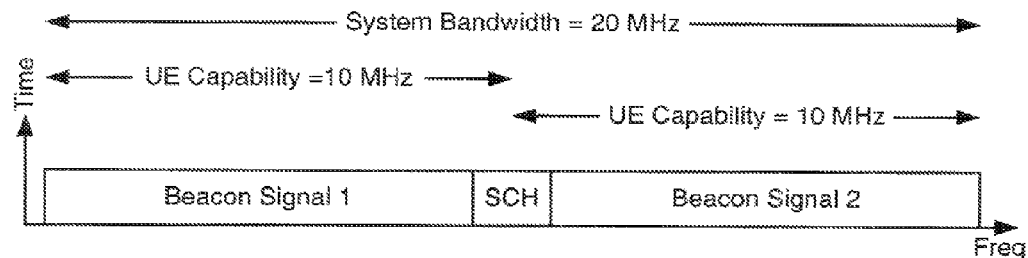
FIGS. 5A-5C show FDM beacon transmission for different system bandwidths.

FIG. 5A shows a design of FDM beacon transmission for a system bandwidth of 20 MHz. In this design, the system bandwidth may be partitioned into a 10 MHz left half and a 10 MHz right half. The PSC and SSC may be transmitted in the center 1.25 MHz of the system bandwidth. One beacon signal may be transmitted in the portion of the left half that is not occupied by the PSC and SSC. Another beacon signal may be transmitted in the portion of the right half that is not occupied by the PSC and SSC.

Figure 5B:
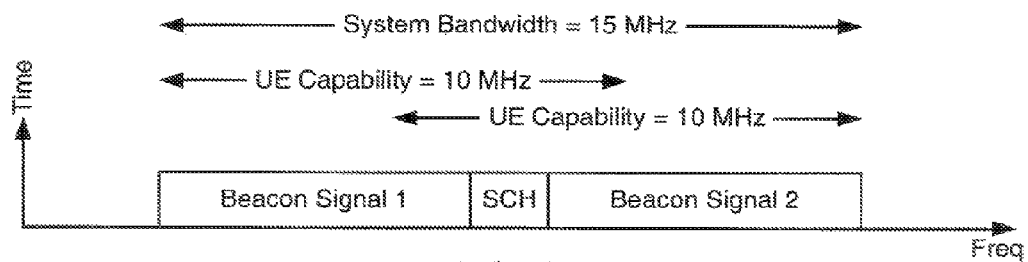

FIG. 5B shows a design of FDM beacon transmission for a system bandwidth of 15 MHz. In this design, the system bandwidth may be partitioned into a 7.5 MHz left half and a 7.5 MHz right half. The PSC and SSC may be transmitted in the center 1.25 MHz of the system bandwidth. One beacon signal may be transmitted in each half in the portion that is not occupied by the PSC and SSC.

Figure 5C:
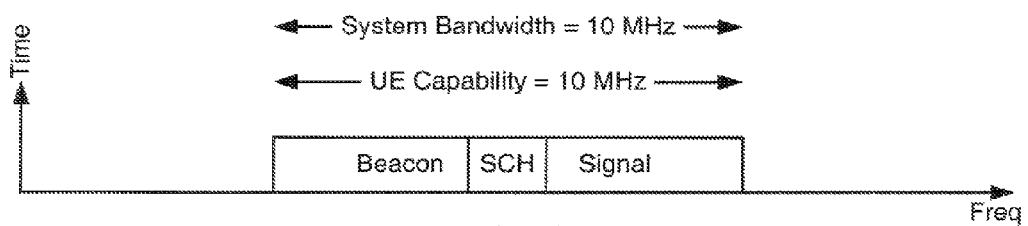

FIG. 5C shows a design of FDM beacon transmission for a system bandwidth of 10 MHz. The PSC and SSC may be transmitted in the center 1.25 MHz of the system bandwidth. One beacon signal may be transmitted in the remaining portion of the system bandwidth that is not occupied by the PSC and SSC. FDM beacon transmission for system bandwidths of 7.5, 5 and 2.5 MHz may be similar to FDM beacon transmission for system bandwidth of 10 MHz.

As shown in FIGS. 4 through 5C, the BSC may be frequency division multiplexed with the PSC and SSC in the same OFDM symbol when the system bandwidth is larger than 1.25 MHz. The BSC overhead may be avoided by using FDM.

In one FDM beacon design, the total cell transmit power may be divided uniformly across the K total subcarriers. The amount of transmit power to use for each beacon subcarrier may then be determined based on the number of usable subcarriers. For 20 MHz system bandwidth, ⅛-th of the total cell transmit power may be used for the PSC or SSC, 7/16-th of the total cell transmit power may be used for the beacon subcarrier to the left of the PSC/SSC, and the remaining 7/16-th of the total cell transmit power may be used for the beacon subcarrier to the right of the PSC/SSC. For 10 MHz system bandwidth, ¼-th of the total cell transmit power may be used for the PSC or SSC, and the remaining ¾-th of the total cell transmit power may be used for the beacon subcarrier to the right or left of the PSC/SSC. The total cell transmit power may also be allocated to the beacon signal(s) and the PSC/SSC in other manners.

In the designs shown in FIGS. 3A to 3C and FIGS. 5A to 5C, the PSC and SSC are sent in 1.25 MHz and are located at the center of the system bandwidth. This allows a UE to perform initial cell search based on the PSC and SSC regardless of the system bandwidth. The PSC and SSC may also be transmitted in other manners, e.g., sent over a different bandwidth and/or placed at other locations within the system bandwidth.

After completing the initial cell search and performing other procedures, a UE may be directed to operate over all or a portion of the system bandwidth. The cells may transmit beacon signals such that the UE can detect for these cells without having to switch frequency. For example, for system bandwidth of 15 or 20 MHz, a 10 MHz capable UE operating on either side of the system bandwidth should be able to receive the beacon signals from neighbor cells without switching frequency.

In one design, the spacing between adjacent subcarriers is fixed at 15 KHz, and the total number of subcarriers is dependent on the system bandwidth. Table 2 lists a set of possible system bandwidths and the total number of subcarriers (K) for each system bandwidth in accordance with one design.

TABLE 2

| System Bandwidth (MHz) | FFT size N | Total Number of Subcarriers K | Number of Usable Subcarriers M | Beacon Signal Bandwidth (MHz) |
|---|---|---|---|---|
| 1.25 | 128 | 75 | 24 | 1.08 |
| 2.5 | 256 | 150 | 48 | 2.16 |
| 5 | 512 | 300 | 92 | 4.32 |
| 7.5 | 768 | 450 | 144 | 6.48 |
| 10 | 1024 | 600 | 184 | 8.64 |
| 15 | 1536 | 900 | 144 | 6.48 |
| 20 | 2048 | 1200 | 184 | 8.64 |

A usable subcarrier is a subcarrier that may be used to send a beacon signal. A set of M usable subcarriers may be defined based on the K total subcarriers, where in general M≤K. In one design, all K total subcarriers may be used to send one or more beacon signals. In other designs, a subset of the K subcarriers may be used to send one or more beacon signals.

In one design, the number of usable subcarriers for a beacon signal is scalable and varies as a function of system bandwidth. For the TDM beacon design shown in Table 2, every third subcarrier may be used to send a beacon signal, and the usable subcarriers are spaced apart by 45 KHz. For a system bandwidth of 10 MHz or less, one beacon signal may be sent, and the number of usable subcarriers may be approximately one third of the total number of subcarriers, or M≈K/3. For a system bandwidth of more than 10 MHz, two beacon signals may be sent, and the number of usable subcarriers for each beacon signal may be approximately one sixth of the total number of subcarriers, or M≈K/6. The larger number of usable subcarriers for larger system bandwidths may be used to support more cell IDs, reduce beacon hopping pattern length, reduce neighbor cell search time, etc.

In another design, every other subcarrier may be used to send a beacon signal, and the usable subcarriers are spaced apart by 30 KHz. An integer multiple of 32 subcarriers may be usable for the beacon signal depending on the system bandwidth.

In yet another design, the number of usable subcarriers for a beacon signal may be fixed, and the spacing between usable subcarriers may vary as a function of the system bandwidth. For example, the usable subcarrier spacing may be 45 KHz for 1.25 MHz system bandwidth, 90 KHz for 2.5 MHz system bandwidth, etc.

In general, any number of usable subcarriers may be defined, and the usable subcarriers may be spaced apart by any amount. The number of usable subcarriers and the usable subcarrier spacing may be selected based on the total number of subcarriers, the desired minimum number of usable subcarriers, the desired minimum spacing between usable subcarriers, etc. The same number of usable subcarriers and the same spacing may be used for all beacon symbols. Alternatively, the number of usable subcarriers and/or the spacing may vary for different beacon symbols.

Figure 6:
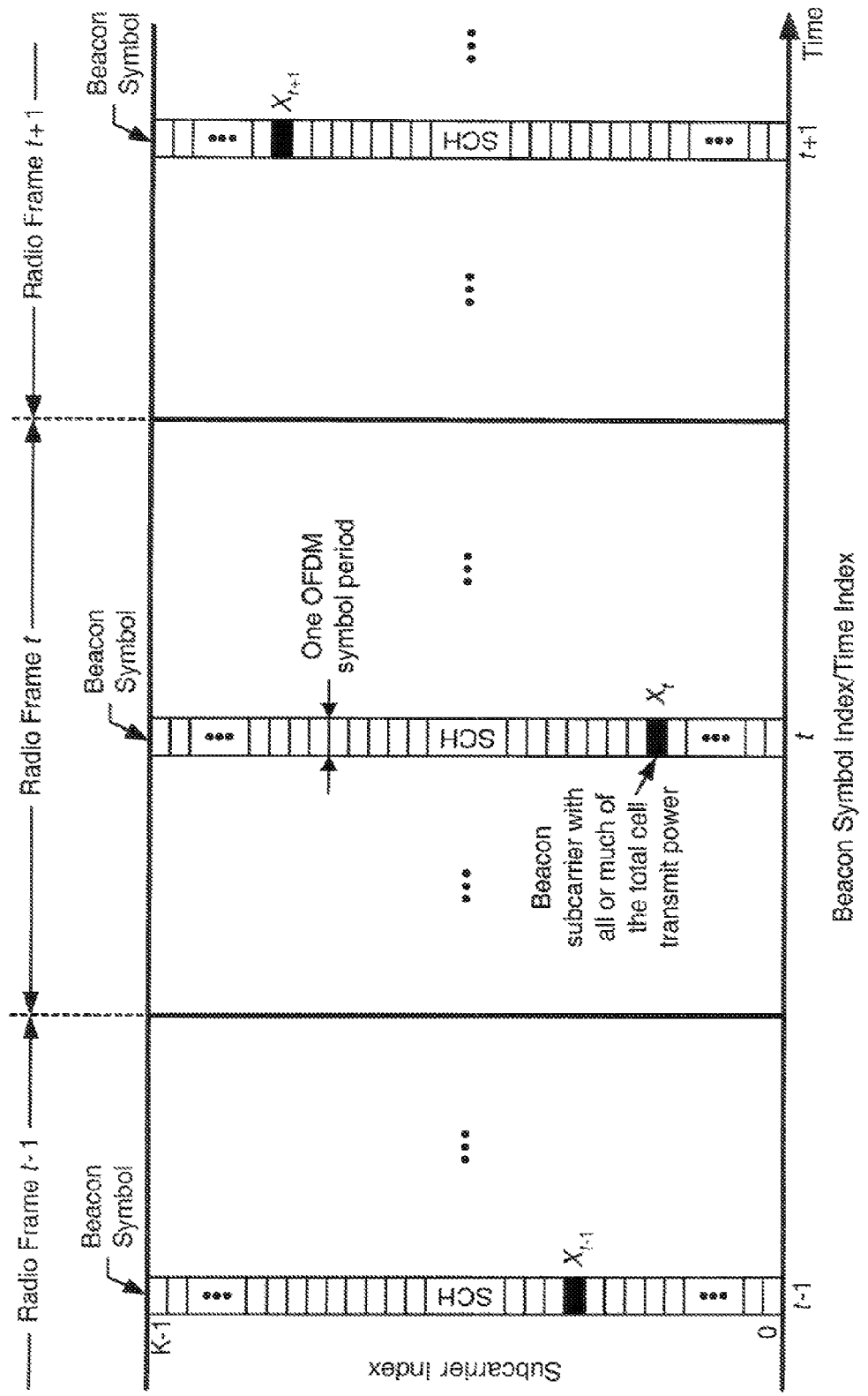
FIG. 6 shows a beacon signal for one cell.

FIG. 6 shows a beacon signal for one cell in accordance with an FDM design. In this design, the beacon signal is composed of one beacon symbol in each radio frame. In one design, a beacon symbol may be sent in a symbol period reserved for beacon transmission, e.g., as shown in FIG. 2. In another design, a beacon symbol may replace (or puncture) another OFDM symbol. In any case, the beacon symbols may be transmitted in locations that are known a priori by the UEs.

A beacon subcarrier is a subcarrier that has all or much of the transmit power used for a beacon signal. A beacon subcarrier may be selected from the set of usable subcarriers. As shown in FIG. 6, different beacon subcarriers may be used for different beacon symbols, and the beacon subcarrier may vary from one beacon symbol to the next. In the example shown in FIG. 6, subcarrier $X_{t-1}$ is used for the beacon symbol transmitted in radio frame t−1, subcarrier $X_t$ is used for the beacon symbol transmitted in radio frame t, subcarrier $X_{t+1}$ is used for the beacon symbol transmitted in radio frame t+1, etc.

Since all or a large portion of the total cell transmit power may be used for one subcarrier in a beacon symbol, a very high SNR may be achieved for the beacon subcarrier. For example, the SNR of the beacon subcarrier may be increased by $10 \log_{10}(75)=18.75$ dB if one out of 75 subcarriers is used for the beacon subcarrier with a system bandwidth of 1.25 MHz, increased by $10 \log_{10}(300)=24.77$ dB if one out of 300 subcarriers is used for the beacon subcarrier with a system bandwidth of 5 MHz, etc. Furthermore, the overhead for the beacon signal may be relatively small. For example, if a beacon symbol is transmitted in one symbol period in each radio frame of 140 symbol periods (e.g., with 10 subframes/radio frame and 14 symbol periods/subframe), then the beacon overhead is only 0.7%.

Figure 7:
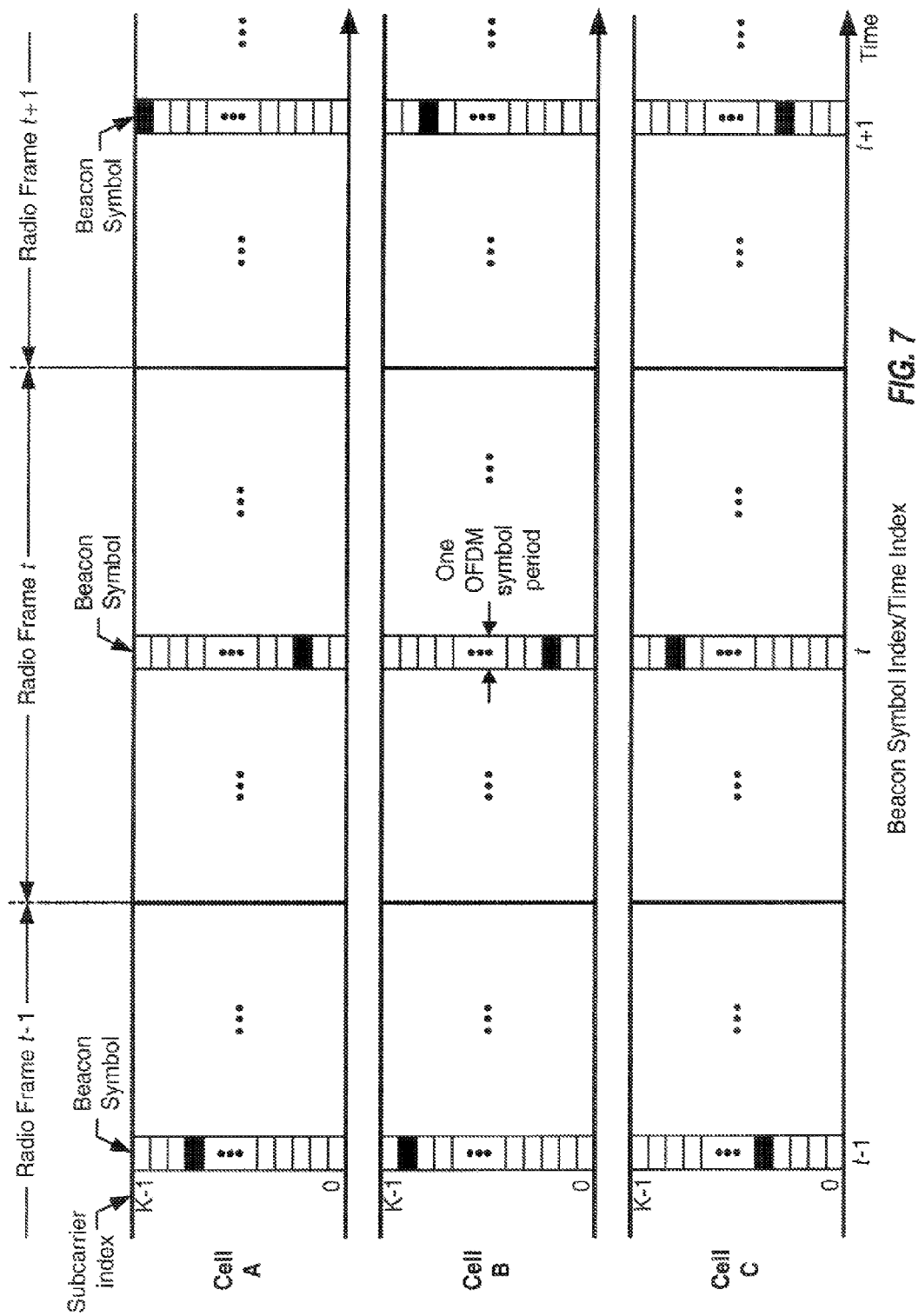
FIG. 7 shows beacon signals for three cells.

FIG. 7 shows example beacon transmissions for three cells A, B and C in accordance with an FDM design. In this design, each cell may transmit one beacon symbol in one symbol period in each radio frame, and all three cells may transmit their beacon symbols in the same symbol period. However, the three cells may transmit their beacon symbols on different beacon subcarriers, which may be determined based on the beacon hopping patterns or beacon codes for these cells. In another design, different cells may transmit their beacon symbols in different symbol periods in order to avoid collision of their beacon subcarriers.

In general, any type of information and any amount of information may be sent in a beacon signal. The number of information bits (L) that can be sent in the beacon signal may be determined by the number of usable subcarriers (M) for the beacon signal and the number of beacon symbols (Q) in which the information is sent. As an example, if the beacon signal is sent in 24 usable subcarriers, then one out of $24^2=576$ possible values (or a 9-bit value) may be sent in two beacon symbols. As another example, if the beacon signal is sent in 32 usable subcarriers, then one out of $32^2=1024$ possible values (or a 10-bit value) may be sent in two beacon symbols. Alternatively, a 9-bit value may be sent with 32 usable subcarriers (e.g., spaced apart by 30 KHz) for one beacon symbol and with 16 usable subcarriers (e.g., spaced apart by 60 KHz) for another beacon symbol. In general, up to $\lfloor \log_2(M^Q) \rfloor$ information bits may be sent in the beacon signal on M usable subcarriers in Q beacon symbols. The information may be sent in more than the minimum number of (Q) beacon symbols in order to improve reliability, increase frequency diversity, and improve false alarm rate for a given probability of detection.

In one design, a beacon signal carries a cell ID of a cell. For the design shown in Table 2 with M=24 for a system bandwidth of 1.25 MHz, a 9-bit cell ID may be sent in the beacon signal in two beacon symbols. The beacon signal may also carry other information.

In one design, each cell is assigned a cell-specific beacon hopping pattern that indicates which subcarrier to use for the beacon subcarrier in each beacon symbol. For example, 512 different beacon hopping patterns may be defined and associated with 512 possible cell IDs, one beacon hopping pattern for each cell ID. Different sets of 512 beacon hopping patterns may also be defined for different system bandwidths, one set for each system bandwidth. Each cell may transmit its beacon signal using the beacon hopping pattern for its cell ID. The beacon hopping patterns may be defined such that for any two consecutive beacon symbols, different cell IDs are associated with unique pairs of beacon subcarriers. For example, the 512 cell IDs may be associated with 512 unique pairs of beacon subcarriers in two consecutive beacon symbols. This would then allow a UE to detect all neighbor cells with any two beacon symbols.

The cells in the system may be assigned beacon hopping patterns such that their beacon subcarriers do not collide. For example, if there are M=24 usable subcarriers, then up to 24 different cells may transmit their beacon signals on 24 different subcarriers in a given symbol period. The length of the beacon hopping patterns may be dependent on the number of usable subcarriers and the number of possible cell IDs. A larger system bandwidth may provide more usable subcarriers and allow for use of shorter beacon hopping patterns, which may reduce neighbor cell search time.

For beacon detection, a UE may perform OFDM demodulation for each symbol period in which a beacon symbol is sent and obtain K received symbols for the K total subcarriers. The UE may determine the received signal quality of each subcarrier based on the received symbol for that subcarrier, compare the received signal quality of each subcarrier against a threshold, and retain candidate subcarriers with received signal quality exceeding the threshold. The UE may also use received power and/or some other metric to identify candidate subcarriers. The UE may maintain a list of candidate subcarriers for different beacon symbols. The UE may then identify neighbor cells based on the list of candidate subcarriers and the known cell-specific beacon hopping patterns for all possible cell IDs.

In another design, each cell is assigned a cell-specific beacon code that indicates which subcarrier to use for the beacon subcarrier in each beacon symbol. The beacon code may be a maximum distance separable (MDS) code, which can generate codewords having the largest possible minimum distance between codewords and thus provides the most error correcting capability for a given amount of redundancy. Reed-Solomon code is one example of an MDS code. Some polynomial codes may also have certain characteristics of an MDS code.

In one example Reed-Solomon code design, M subcarriers are used to transmit a beacon signal and are assigned indices of 0 through M−1, where M may be dependent on the system bandwidth. Beacon symbols are transmitted at different times given by index t, where $0 \leq t < \infty$. For a beacon symbol with index t, the beacon signal may be transmitted on a subcarrier with index $X_t$, which may be expressed as:

$$X_t = p_1^{\alpha_1 + Zt} \oplus p_1^{\alpha_2} p_2^{Zt}, \quad \text{Eq (1)}$$

where $p_1$ is a primitive element of field $Z_M$ and $p_2 = p_1^2$, $\alpha_1$ and $\alpha_2$ are exponent factors determined based on the cell ID, Z is an upper end of the range for $\alpha_1$, and $\oplus$ denotes modulo addition.

Field $Z_M$ contains M elements 0 through M−1. A primitive element of field $Z_M$ is an element of $Z_M$ that may be used to generate all M−1 non-zero elements of $Z_M$. As an example, for field $Z_7$ containing seven elements 0 through 6, 5 is a primitive element of $Z_7$ and may be used to generate all six non-zero elements of $Z_7$ as follows: $5^0 \mod 7 = 1$, $5^1 \mod 7 = 5$, $5^2 \mod 7 = 4$, $5^3 \mod 7 = 6$, $5^4 \mod 7 = 2$, and $5^5 \mod 7 = 3$.

In equation (1), arithmetic operations are over field $Z_M$. For example, addition of A and B may be given as $(A+B) \mod M$, multiplication of A with B may be given as $(A \cdot B) \mod M$, A raised to the power of B may be given as $A^B \mod M$, etc. The additions within the exponents are modulo-M integer additions.

Different beacon codes may be defined with different values of Z and M. The beacon code shown in equation (1) is periodic with a period of P=M/Z symbols. Hence, $X_t = X_{t+P}$ for any given t.

The exponent factors $\alpha_1$ and $\alpha_2$ may be defined as:

$0 \leq \alpha_1 < Z$, and $0 \leq \alpha_2 \leq (M-1)$. Eq (2)

A cell ID (or a message) may be mapped to $\alpha_1$ and $\alpha_2$ as follows:

cell ID = $(M-1) \cdot \alpha_1 + \alpha_2$, or cell ID = $\alpha_1 + (Z-1) \cdot \alpha_2$. Eq (3)

A UE can recover a cell ID sent in a beacon signal with two consecutive beacon symbols in the presence of one cell even without time information. For example, the UE may receive two beacon symbols $x_1$ and $x_2$ at times t and t+1. The received beacon symbols may be expressed as:

$x_1 = p_1^{\alpha_1 + Zt} \oplus p_1^{\alpha_2} p_2^{Zt}$, and $x_2 = p_1^{\alpha_1 + Z(t+1)} \oplus p_1^{\alpha_2} p_2^{Z(t+1)} = p_1^Z p_1^{\alpha_1 + Zt} \oplus p_2^Z p_1^{\alpha_2} p_2^{Zt}$. Eq (4)

Equation set (4) may be expressed in matrix form as follows:

$$\begin{pmatrix} x_1 \\ x_2 \end{pmatrix} = \begin{pmatrix} 1 & 1 \\ p_1^Z & p_2^Z \end{pmatrix} \begin{pmatrix} p_1^{\alpha_1 + Zt} \\ p_1^{\alpha_2} p_2^{Zt} \end{pmatrix} = A \begin{pmatrix} p_1^{\alpha_1 + Zt} \\ p_1^{\alpha_2} p_2^{Zt} \end{pmatrix}, \quad \text{Eq (5)}$$

where $p_1^Z$ and $p_2^Z$ are equal to two specific elements of field $Z_M$.

The UE may solve for terms $p_1^{\alpha_1 + Zt}$ and $p_1^{\alpha_2} p_2^{Zt}$ in equation (5), as follows:

$$\begin{pmatrix} y_1 \\ y_2 \end{pmatrix} = A^{-1} \begin{pmatrix} x_1 \\ x_2 \end{pmatrix} = \begin{pmatrix} p_1^{\alpha_1 + Zt} \\ p_1^{\alpha_2} p_2^{Zt} \end{pmatrix}. \quad \text{Eq (6)}$$

The UE may obtain the exponent of $p_1^{\alpha_1 + Zt}$ as follows:

$z_1 = \log(y_1)/\log(p_1) = (\alpha_1 + Zt) \mod M$. Eq (7)

The logarithm in equation (7) is over field $Z_M$. A given value of y maps to a specific value of z. The mapping from y to z may be performed with a look-up table or in some other manner. The exponent factor $\alpha_1$ and time index t may be obtained from equation (7), as follows:

$\alpha_1 = z_1 \mod Z$, and Eq (8a)

$t = z_1 \div Z$. Eq (8b)

Factor $\alpha_2$ may be determined by substituting t obtained from equation (8b) into $y_2 = p_1^{\alpha_2} p_2^{Zt}$ to obtain $p_1^{\alpha_2}$, and then solving for $\alpha_2$ based on $p_1^{\alpha_2}$.

The UE can also recover the cell ID from the beacon signal with any two non-consecutive beacon symbols in the presence of one cell. The elements of matrix A are dependent on the beacon symbols received by the UE. The UE can also recover cell IDs from the beacon signals transmitted by two cells with three consecutive beacon symbols.

The beacon code shown in equation (1) may be used to generate beacon hopping patterns for all possible cell IDs. Other beacon codes may also be used for the beacon signal.

Figure 8:
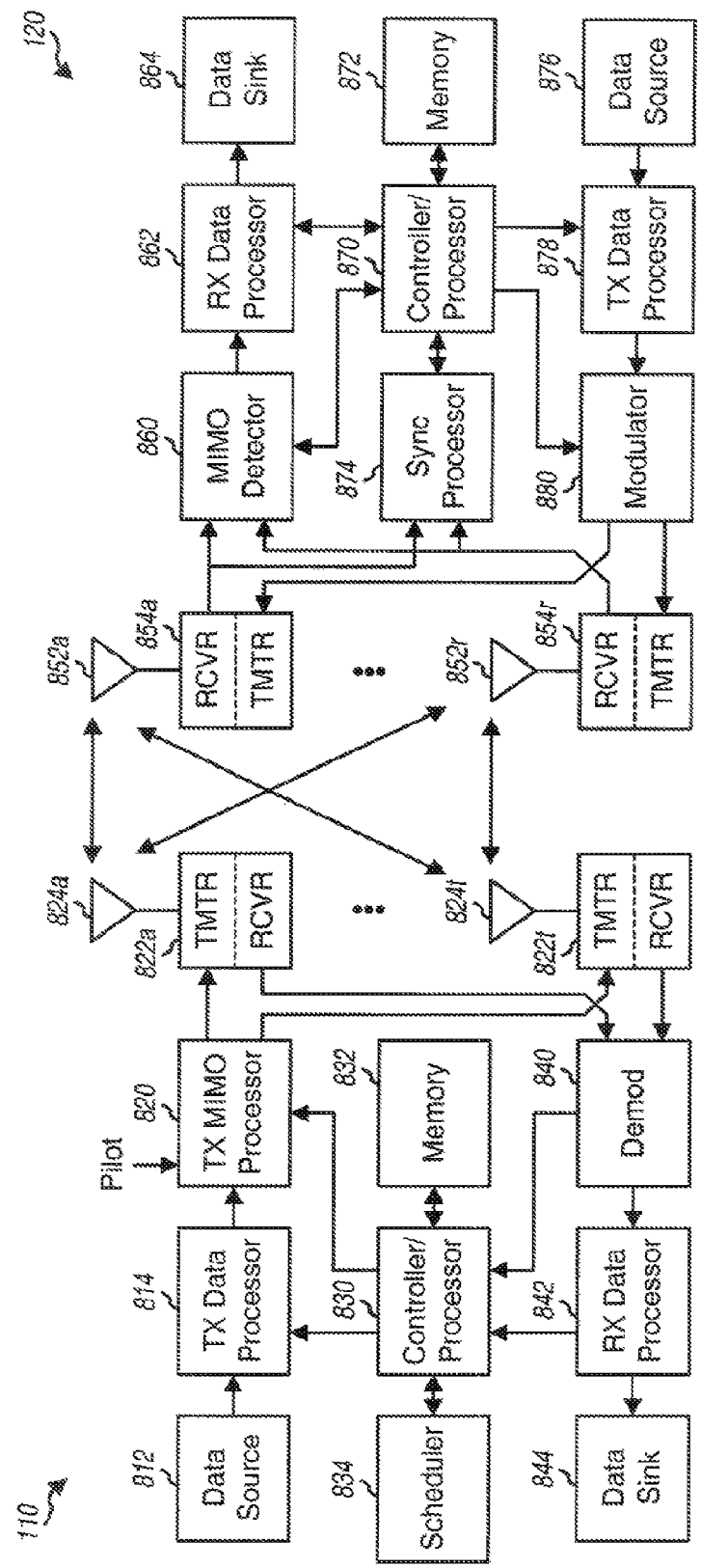
FIG. 8 shows a block diagram of a Node B and a UE.

FIG. 8 shows a block diagram of a design of Node B 110 and UE 120, which are one of the Node Bs and one of the UEs in FIG. 1. In this design, Node B 110 is equipped with T antennas 824a through 824t, and UE 120 is equipped with R antennas 852a through 852r, where in general T≥1 and R≥1.

At Node B 110, a transmit (TX) data processor 814 may receive traffic data for one or more UEs from a data source 812. TX data processor 814 may process (e.g., format, encode, and interleave) the traffic data for each UE based on one or more coding schemes selected for that UE to obtain coded data. TX data processor 814 may then modulate (or symbol map) the coded data for each UE based on one or more modulation schemes (e.g., BPSK, QSPK, PSK or QAM) selected for that UE to obtain modulation symbols.

A TX MIMO processor 820 may multiplex the modulation symbols for all UEs with pilot symbols using any multiplexing scheme. Pilot is typically known data that is processed in a known manner and may be used by a receiver for channel estimation and other purposes. TX MIMO processor 820 may process (e.g., precode) the multiplexed modulation symbols and pilot symbols and provide T output symbol streams to T transmitters (TMTR) 822a through 822t. In certain designs, TX MIMO processor 820 may apply beamforming weights to the modulation symbols to spatially steer these symbols. Each transmitter 822 may process a respective output symbol stream (e.g., for OFDM) to obtain an output chip stream. Each transmitter 822 may further process (e.g., convert to analog, amplify, filter, and upconvert) the output chip stream to obtain a downlink signal. T downlink signals from transmitters 822a through 822t may be transmitted via T antennas 824a through 824t, respectively.

At UE 120, antennas 852a through 852r may receive the downlink signals from Node B 110 and provide received signals to receivers (RCVR) 854a through 854r, respectively. Each receiver 854 may condition (e.g., filter, amplify, downconvert, and digitize) a respective received signal to obtain samples and may further process the samples (e.g., for OFDM) to obtain received symbols. A MIMO detector 860 may receive and process the received symbols from all R receivers 854a through 854r based on a MIMO receiver processing technique to obtain detected symbols, which are estimates of the modulation symbols transmitted by Node B 110. A receive (RX) data processor 862 may then process (e.g., demodulate, deinterleave, and decode) the detected symbols and provide decoded data for UE 120 to a data sink 864. In general, the processing by MIMO detector 860 and RX data processor 862 is complementary to the processing by TX MIMO processor 820 and TX data processor 814 at Node B 110.

On the uplink, at UE 120, traffic data from a data source 876 and signaling may be processed by a TX data processor 878, further processed by a modulator 880, conditioned by transmitters 854a through 854r, and transmitted to Node B 110. At Node B 110, the uplink signals from UE 120 may be received by antennas 824, conditioned by receivers 822, demodulated by a demodulator 840, and processed by an RX data processor 842 to obtain the traffic data and signaling transmitted by UE 120.

Controllers/processors 830 and 870 may direct the operation at Node B 110 and UE 120, respectively. Memories 832 and 872 may store data and program codes for Node B 110 and UE 120, respectively. A synchronization (Sync) processor 874 may perform initial cell search and neighbor cell search based on the samples from receivers 854 and may provide cell IDs and other information for detected cells. A scheduler 834 may schedule UEs for downlink and/or uplink transmission and may provide assignments of resources for the scheduled UEs.

Figure 9:
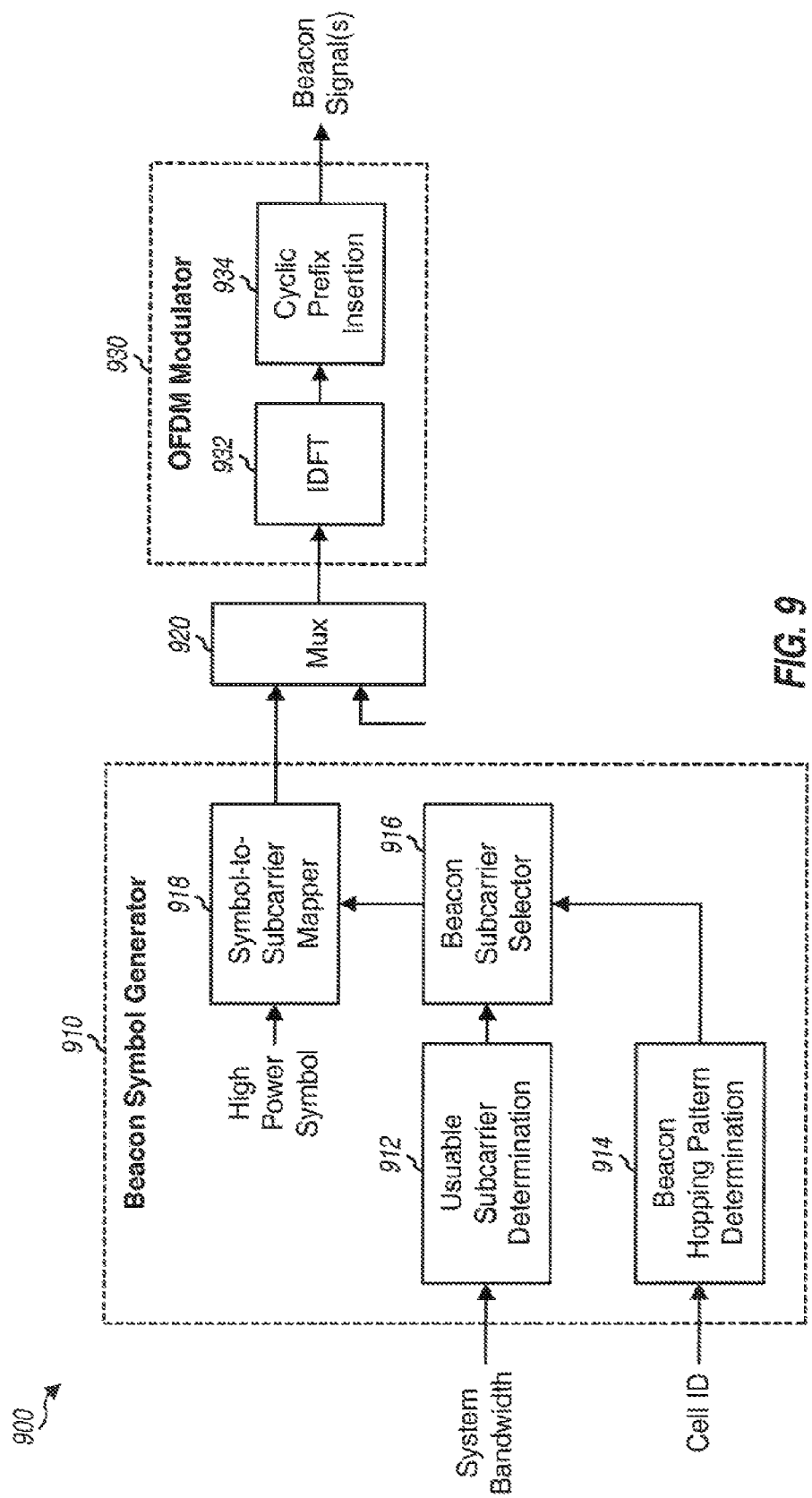
FIG. 9 shows a block diagram of a beacon signal generator at the Node B.

FIG. 9 shows a block diagram of a design of a beacon signal generator 900, which includes a beacon symbol generator 910 and an OFDM modulator 930. Generator 910 may be part of TX data processor 814 at Node B 110, and OFDM modulator 930 may be part of each transmitter 822.

Within beacon symbol generator 910, a unit 912 may receive the system bandwidth and determine a set of usable subcarriers for a beacon signal based on the system bandwidth. A unit 914 may receive a cell ID and/or other information and determine a beacon hopping pattern or a beacon code based on the received information. For each beacon symbol, a selector 916 may select a beacon subcarrier from the set of usable subcarriers based on the beacon hopping pattern or beacon code. One or multiple beacon signals may be transmitted, depending on the system bandwidth. For each beacon symbol, a mapper 918 may map a high power symbol to the beacon subcarrier for each beacon signal and may map symbols with zero values to remaining subcarriers. A multiplexer (Mux) 920 may multiplex the symbols from generator 910 with other symbols for TDM or FDM.

Within OFDM modulator 930, an inverse discrete Fourier transform (IDFT) unit 932 may perform an IDFT on K symbols from multiplexer 920 for each beacon symbol period and provide K time-domain samples. A cyclic prefix insertion unit 934 may append a cyclic prefix to the K time-domain samples by copying the last C samples and appending these C samples to the front of the K samples. Unit 934 may provide an OFDM symbol containing a high power symbol on each beacon subcarrier and zero values on remaining subcarriers used for the beacon signal(s).

Figure 10:
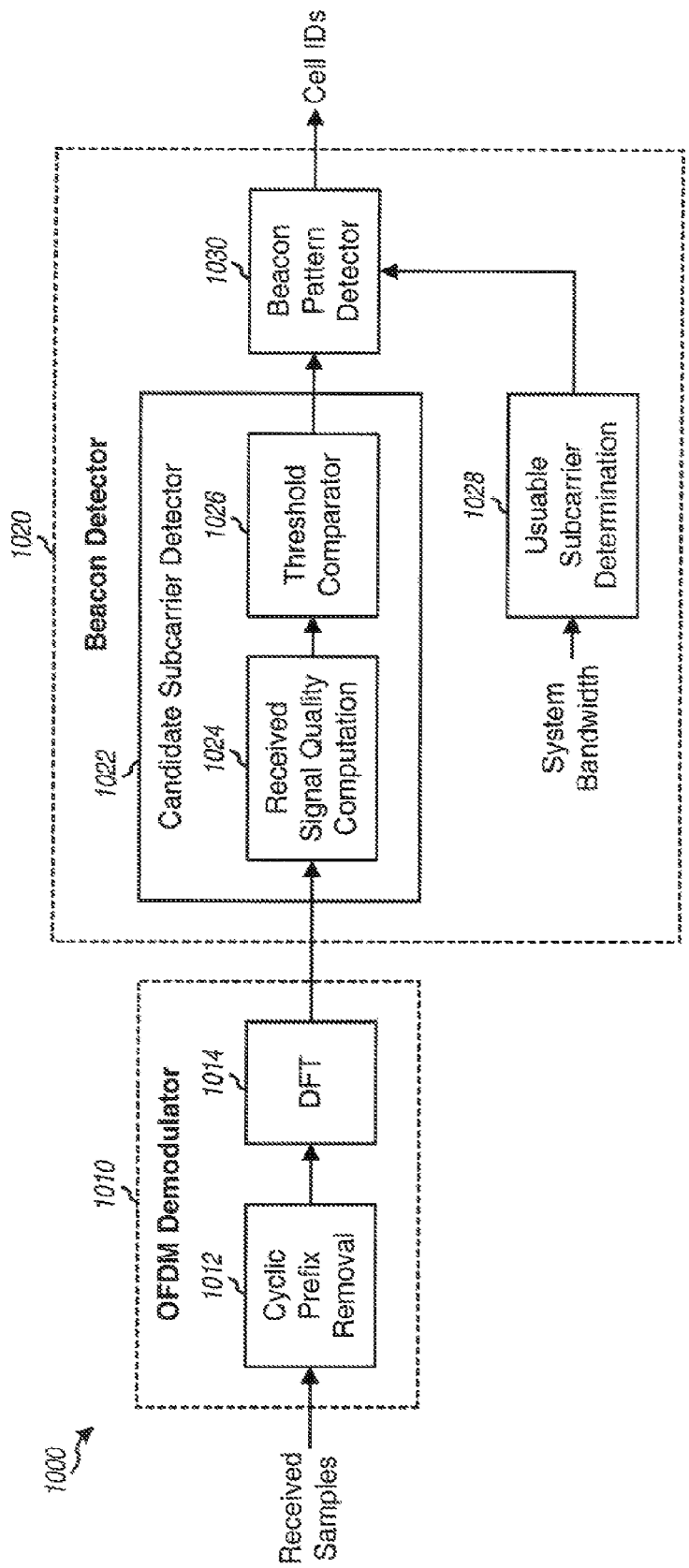
FIG. 10 shows a block diagram of a beacon processor at the UE.

FIG. 10 shows a block diagram of a design of a beacon processor 1000, which includes an OFDM demodulator 1010 and a beacon detector 1020. OFDM demodulator 1010 may be part of each receiver 854 at UE 120, and beacon detector 1020 may be part of sync processor 874.

Within OFDM demodulator 1010, for each received OFDM symbol, a cyclic prefix removal unit 1012 may remove the cyclic prefix and provide K received samples. A discrete Fourier transform (DFT) unit 1014 may perform a DFT on the K received samples and provide K received symbols.

Within beacon detector 1020, a unit 1022 may detect for candidate subcarriers in each beacon symbol. Within unit 1022, a unit 1024 may compute the signal quality of each received symbol and provide the received signal quality of the corresponding subcarrier. A comparator 1026 may compare the received signal quality of each subcarrier against a threshold and provide subcarriers with received signal quality exceeding the threshold as candidate subcarriers. A unit 1028 may receive the system bandwidth and determine a set of usable subcarriers based on the system bandwidth. A beacon pattern detector 1030 may detect for cell IDs based on the candidate subcarriers, the set of usable subcarriers, and the beacon hopping patterns for all possible cell IDs. Alternatively, detector 1030 may detect for cell IDs based on the beacon code.

Figure 11:
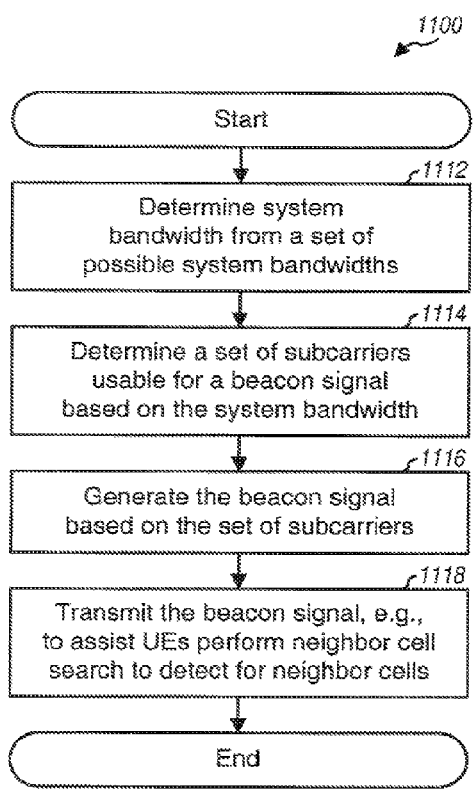
FIG. 11 shows a process for beacon transmission by the Node B.

FIG. 11 shows a design of a process 1100 for beacon transmission. Process 1100 may be performed by a transmitter such as a Node B, a repeater, a broadcast station, etc. The system bandwidth may be determined from a set of possible system bandwidths (block 1112). A set of subcarriers usable for a beacon signal may be determined based on the system bandwidth (block 1114). The usable subcarriers may have a predetermined spacing, and the number of usable subcarriers may be dependent on the system bandwidth, e.g., as shown in Table 2. Alternatively, the number of usable subcarriers may be fixed, and the spacing between usable subcarriers may be dependent on the system bandwidth. In any case, the beacon signal may be generated based on the set of subcarriers (block 1116). The beacon signal may be transmitted to assist receivers detect for the transmitter/cell, e.g., to assist UEs perform neighbor cell search to detect for neighbor cells while the UEs are in idle and active states (block 1118). A cell may correspond to any type of transmitter.

In one design of block 1116, the beacon signal may be mapped to one subcarrier (or a beacon subcarrier) in the set of subcarriers in each symbol period in which the beacon signal is transmitted. In one design, a beacon hopping pattern may be determined based on a cell ID, and the beacon subcarrier may be selected from the set of subcarriers based on the beacon hopping pattern. In another design, the beacon subcarrier may be selected from the set of subcarriers based on a beacon code that may indicate which subcarrier to use for the beacon signal in each beacon symbol period. In general, one or more subcarriers may be selected from the set of subcarriers in each beacon symbol period based on any scheme.

The beacon signal may be sent using TDM, and only the beacon signal may be mapped to the system bandwidth in each beacon symbol period. The beacon signal may also be sent using FDM, and the beacon signal and at least one other signal may be mapped to different parts of the system bandwidth in each beacon symbol period.

The number of beacon signals to transmit may be determined based on the system bandwidth. For example, one beacon signal may be transmitted if the system bandwidth is equal to or less than a predetermined value, and multiple beacon signals may be transmitted if the system bandwidth is greater than the predetermined value.

Figure 12:
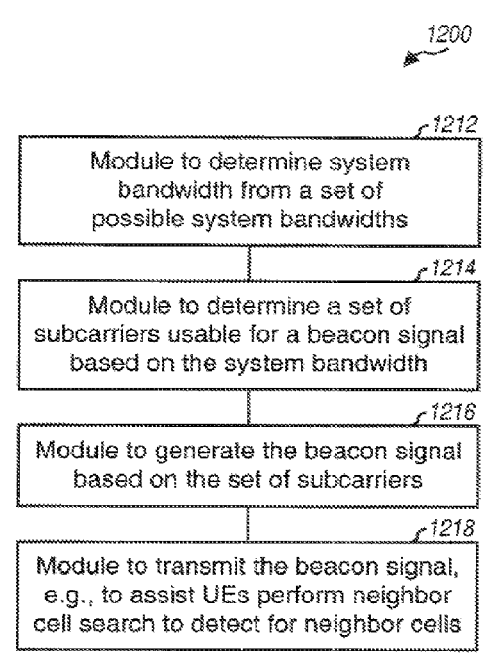
FIG. 12 shows an apparatus for beacon transmission.

FIG. 12 shows a design of an apparatus 1200 for beacon transmission. Apparatus 1200 includes means for determining the system bandwidth from a set of possible system bandwidths (module 1212), means for determining a set of subcarriers usable for a beacon signal based on the system bandwidth (module 1214), means for generating the beacon signal based on the set of subcarriers (module 1216), and means for transmitting the beacon signal to assist UEs perform neighbor cell search to detect for neighbor cells (module 1218).

Figure 13:
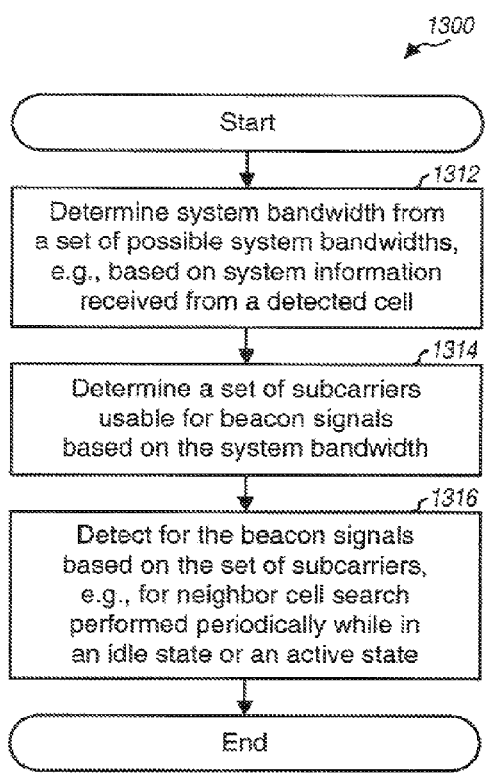
FIG. 13 shows a process for beacon detection by the UE.

FIG. 13 shows a design of a process 1300 for beacon detection. Process 1300 may be performed by a receiver such as a UE, etc. The system bandwidth may be determined from a set of possible system bandwidths, e.g., based on system information received from a cell detected during initial cell search (block 1312). A set of subcarriers usable for beacon signals may be determined based on the system bandwidth (block 1314). The beacon signals may be detected based on the set of subcarriers (block 1316). The receiver may periodically perform neighbor cell search to detect for beacon signals from neighbor cells while operating in an idle state or an active state.

In one design of block 1316, demodulation may be performed for each symbol period in which the beacon signals are transmitted to obtain received symbols. Candidate subcarriers with received signal quality exceeding a threshold may be determined based on the received symbols. Cells transmitting the beacon signals may be identified based on the candidate subcarriers and beacon hopping patterns for different possible IDs or a beacon code indicating which subcarrier to use for a beacon signal in each symbol period for each possible ID. The beacon detection in block 1316 may be based on beacon signals received from (i) the entire system bandwidth if it is equal to or less than a predetermined value or (ii) a portion of the system bandwidth if it is greater than the predetermined value.

Figure 14:
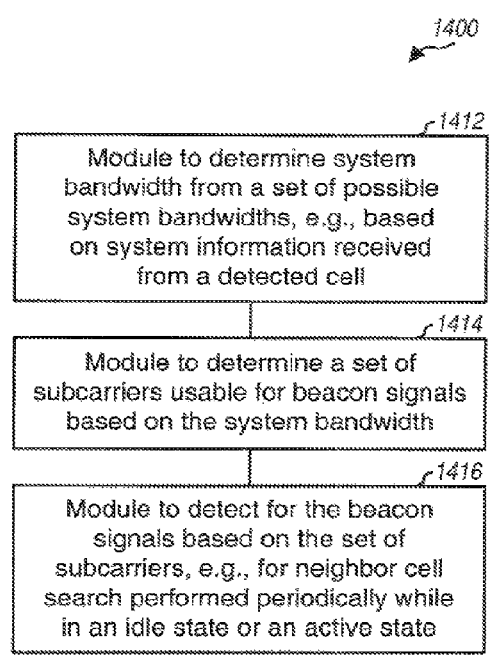
FIG. 14 shows an apparatus for beacon detection.

FIG. 14 shows a design of an apparatus 1400 for beacon detection. Apparatus 1400 includes means for determining the system bandwidth from a set of possible system bandwidths (module 1412), means for determining a set of subcarriers usable for beacon signals based on the system bandwidth (module 1414), and means for detecting for the beacon signals based on the set of subcarriers (module 1416).

FIG. 15 shows a design of a process 1500 for synchronization signal transmission by a Node B. A wideband primary synchronization signal used by UEs for cell detection during initial cell search may be generated, e.g., based on a PSC sequence (block 1512). A wideband secondary synchronization signal used by the UEs for cell identification during initial cell search may also be generated, e.g., based on an SSC sequence or a pseudo-random sequence for a cell ID (block 1514). A narrowband beacon signal used by the UEs for neighbor cell search may be generated, e.g., based on a beacon hopping pattern or a beacon code for the cell ID (block 1516). The wideband primary and secondary synchronization signals may be sent, e.g., on a fixed portion of the system bandwidth (block 1518). The narrowband beacon signal may be sent, e.g., on different subcarriers in different symbol periods in which the beacon signal is transmitted (block 1520).

FIG. 16 shows a design of an apparatus 1600 for synchronization signal transmission. Apparatus 1600 includes means for generating a wideband primary synchronization signal used by UEs for cell detection during initial cell search (module 1612), means for generating a wideband secondary synchronization signal used by the UEs for cell identification during initial cell search (module 1614), means for generating a narrowband beacon signal used by the UEs for neighbor cell search (module 1616), means for sending the wideband primary and secondary synchronization signals, e.g., on a fixed portion of the system bandwidth (module 1618), and means for sending the narrowband beacon signal, e.g., on different subcarriers in different symbol periods in which the beacon signal is transmitted (module 1620).

FIG. 17 shows a design of a process 1700 for performing cell searches by a UE. Wideband primary and/or secondary synchronization signals may be received from a fixed portion of the system bandwidth (block 1712). Narrowband beacon signals may be received from different subcarriers in different symbol periods in which the beacon signals are transmitted (block 1714). Initial cell search may be performed based on the wideband primary and secondary synchronization signals transmitted by the cells. Cells may be detected based on the wideband primary synchronization signals transmitted by these cells (block 1716). Detected cells may be identified based on the wideband secondary synchronization signals transmitted by these cells (block 1718). Neighbor cell search may be performed based on the narrowband beacon signals transmitted by the cells (block 1720). The wideband secondary synchronization signals may be detected based on pseudo-random sequences for a set of possible cell IDs. The narrowband beacon signals may be detected based on a set of beacon hopping patterns for the set of possible cell IDs.

FIG. 18 shows a design of an apparatus 1800 for performing cell searches. Apparatus 1800 includes means for receiving wideband primary and/or secondary synchronization signals from a fixed portion of the system bandwidth (module 1812), means for receiving narrowband beacon signals from different subcarriers in different symbol periods in which the beacon signals are transmitted (module 1814), means for detecting for cells based on the wideband primary synchronization signals transmitted by these cells (module 1816), means for identifying detected cells based on the wideband secondary synchronization signals transmitted by these cells (module 1818), and means for performing neighbor cell search based on the narrowband beacon signals transmitted by the cells (module 1820).

FIG. 19 shows a design of a process 1900 for FDM beacon transmission by a Node B. A beacon signal may be generated, e.g., based on a beacon hopping pattern or a beacon code (block 1912). At least one other signal may also be generated (block 1914). The beacon signal and the at least one other signal may be frequency division multiplexed on different parts of the system bandwidth (block 1916). The beacon signal may be mapped to different subcarriers in a first part of the system bandwidth in different symbol periods in which the beacon signal is transmitted. The at least one other signal may be mapped to a second part of the system bandwidth in the symbol periods in which the beacon signal is transmitted. The at least one other signal may comprise (i) a primary synchronization signal used for cell detection during initial cell search and/or (ii) a secondary synchronization signal used for cell identification during initial cell search. The bandwidth of the beacon signal may be scalable and determined based on the system bandwidth. The transmit power of the beacon signal and the transmit power of the at least one other signal may be determined based on the fractions of the system bandwidth used for these signals.

FIG. 20 shows a design of an apparatus 2000 for FDM beacon transmission. Apparatus 2000 includes means for generating a beacon signal, e.g., based on a beacon hopping pattern or a beacon code (module 2012), means for generating at least one other signal (module 2014), and means for frequency division multiplexing the beacon signal and the at least one other signal on different parts of the system bandwidth (module 2016).

FIG. 21 shows a design of a process 2100 for FDM beacon reception by a UE. Beacon signals may be received from a first part of the system bandwidth (block 2112). Other signals may be received from a second part of the system bandwidth (block 2114). The beacon signals and the other signals may be frequency division multiplexed. The other signals may comprise (i) primary synchronization signals used for cell detection during initial cell search and/or (ii) secondary synchronization signals used for cell identification during initial cell search.

FIG. 22 shows a design of an apparatus 2200 for FDM beacon reception. Apparatus 2200 includes means for receiving beacon signals from a first part of the system bandwidth (module 2212), and means for receiving other signals from a second part of the system bandwidth, with the beacon signals and the other signals being frequency division multiplexed (module 2214).

The modules in FIGS. 12, 14, 16, 18, 20 and 22 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured:
to generate wideband synchronization signals used by user equipments (UEs) for initial cell search, wherein the wideband synchronization signals comprise a secondary synchronization signal generated based on a pseudo-random sequence for a cell identifier (ID), to generate, based on a beacon hopping pattern for the cell ID, a narrowband beacon signal used by the UEs for neighbor cell search, and to send the wideband synchronization signals and the narrowband beacon signal; and a memory coupled to the at least one processor.

2. The apparatus of claim 1, wherein the at least one processor is configured to map the wideband synchronization signals to a fixed portion of system bandwidth, and to map the narrowband beacon signal to different subcarriers in different symbol periods in which the narrowband beacon signal is transmitted.

3. The apparatus of claim 1, wherein the narrowband beacon signal is a signal in which all or a large fraction of total cell transmit power is used for one or a few subcarriers.

4. The apparatus of claim 1, wherein the wideband synchronization signals comprise a primary synchronization signal used by the UEs for cell detection during initial cell search.

5. An apparatus for wireless communication, comprising:
at least one processor configured to perform initial cell search based on wideband synchronization signals transmitted by cells in a wireless communication system, wherein the wideband synchronization signals comprise secondary synchronization signals and the at least one processor is configured to perform initial cell search at least in part by detecting for the secondary synchronization signals based on pseudo-random sequences for a set of possible cell identifiers (IDs), and to perform neighbor cell search, based on narrowband beacon signals transmitted by the cells, by detecting for the narrowband beacon signals based on a set of beacon hopping patterns for the set of possible cell IDs; and
a memory coupled to the at least one processor.

6. The apparatus of claim 5, wherein the at least one processor is configured to receive the wideband synchronization signals from a fixed portion of system bandwidth, and to receive the narrowband beacon signals from different subcarriers in different symbol periods in which the narrowband beacon signals are transmitted.

7. The apparatus of claim 5, wherein the narrowband beacon signal is a signal in which all or a large fraction of total cell transmit power is used for one or a few subcarriers.

8. The apparatus of claim 5, wherein the wideband synchronization signals comprise primary synchronization signals, and wherein the at least one processor is configured to detect for cells during initial cell search based on the primary synchronization signals transmitted by the cells.

9. A method for wireless communication, comprising:
generating wideband synchronization signals used by user equipments (UEs) for initial cell search, wherein the wideband synchronization signals comprise a secondary synchronization signal generated based on a pseudo-random sequence for a cell identifier (ID);
generating, based on a beacon hopping pattern for the cell ID, a narrowband beacon signal used by the UEs for neighbor cell search; and
sending the wideband synchronization signals and the narrowband beacon signal.

10. The method of claim 9, further comprising:
mapping the wideband synchronization signals to a fixed portion of system bandwidth; and
mapping the narrowband beacon signal to different subcarriers in different symbol periods in which the narrowband beacon signal is transmitted.

11. The method of claim 9, wherein the narrowband beacon signal is a signal in which all or a large fraction of total cell transmit power is used for one or a few subcarriers.

12. The method of claim 9, wherein the wideband synchronization signals comprise a primary synchronization signal used by the UEs for cell detection during initial cell search.

13. A method for wireless communication, comprising:
performing initial cell search based on wideband synchronization signals transmitted by cells in a wireless communication system, wherein the wideband synchronization signals comprise secondary synchronization signals and performing the initial cell search includes detecting for the secondary synchronization signals based on pseudo-random sequences for a set of possible cell identifiers (IDs); and
performing neighbor cell search based on narrowband beacon signals transmitted by the cells, wherein performing neighbor cell search includes detecting for the narrowband beacon signals based on a set of beacon hopping patterns for the set of possible cell IDs.

14. The method of claim 13, further comprising:
receiving the wideband synchronization signals from a fixed portion of system bandwidth; and
receiving the narrowband beacon signals from different subcarriers in different symbol periods in which the narrowband beacon signals are transmitted.

15. The method of claim 13, wherein the narrowband beacon signals are signals in which all or a large fraction of total cell transmit power is used for one or a few subcarriers.

16. The method of claim 13, wherein the wideband synchronization signals comprise primary synchronization signals, the method further comprising:
detecting for cells during initial cell search based on the primary synchronization signals transmitted by the cells.

17. An apparatus for wireless communication, comprising:
means for generating wideband synchronization signals used by user equipments (UEs) for initial cell search, wherein the wideband synchronization signals comprise a secondary synchronization signal and the means for generating the wideband synchronization signals includes means for generating the secondary synchronization signal based on a pseudo-random sequence for a cell identifier (ID);
means for generating, based on a beacon hopping pattern for the cell ID, a narrowband beacon signal used by the UEs for neighbor cell search; and
means for sending the wideband synchronization signals and the narrowband beacon signal.

18. The apparatus of claim 17, further comprising:
means for mapping the wideband synchronization signals to a fixed portion of system bandwidth; and
means for mapping the narrowband beacon signal to different subcarriers in different symbol periods in which the narrowband beacon signal is transmitted.

19. The apparatus of claim 17, wherein the narrowband beacon signal is a signal in which all or a large fraction of total cell transmit power is used for one or a few subcarriers.

20. The apparatus of claim 17, wherein the wideband synchronization signals comprise a primary synchronization signal used by the UEs for cell detection during initial cell search.

21. An apparatus for wireless communication, comprising:
means for performing initial cell search based on wideband synchronization signals transmitted by cells in a wireless communication system, wherein the wideband synchronization signals comprise secondary synchronization signals and the means for performing initial cell search includes means for detecting for the secondary synchronization signals based on pseudo-random sequences for a set of possible cell identifiers (IDs); and means for performing neighbor cell search based on narrowband beacon signals transmitted by the cells, wherein the means for performing neighbor cell search includes means for detecting for the narrowband beacon signals based on a set of beacon hopping patterns for the set of possible cell IDs.

22. The apparatus of claim 21, further comprising:
means for receiving the wideband synchronization signals from a fixed portion of system bandwidth; and
means for receiving the narrowband beacon signals from different subcarriers in different symbol periods in which the narrowband beacon signals are transmitted.

23. The apparatus of claim 21, wherein the narrowband beacon signals are signals in which all or a large fraction of total cell transmit power is used for one or a few subcarriers.

24. The apparatus of claim 21, wherein the wideband synchronization signals comprise primary synchronization signals, the apparatus further comprising:
means for detecting for cells during initial cell search based on the primary synchronization signals transmitted by the cells.

25. A computer program product comprising a non-transitory computer-readable medium having instructions recorded thereon that cause one or more computers to:
generate wideband synchronization signals used by user equipments (UEs) for initial cell search, wherein the wideband synchronization signals comprise a secondary synchronization signal and the instructions cause the one or more computers to generate the secondary synchronization signal based on a pseudo-random sequence for a cell identifier (ID);
generate, based on a beacon hopping pattern for the cell ID, a narrowband beacon signal used by the UEs for neighbor cell search; and
send the wideband synchronization signals and the narrowband beacon signal.

26. The computer program product of claim 25, wherein the instructions further cause the one or more computers to:
map the wideband synchronization signals to a fixed portion of system bandwidth; and
map the narrowband beacon signal to different subcarriers in different symbol periods in which the narrowband beacon signal is transmitted.

27. The computer program product of claim 25, wherein the narrowband beacon signal is a signal in which all or a large fraction of total cell transmit power is used for one or a few subcarriers.

28. The computer program product of claim 25, wherein the wideband synchronization signals comprise a primary synchronization signal used by the UEs for cell detection during initial cell search.

29. A computer program product comprising a non-transitory computer-readable medium having instructions recorded thereon that cause one or more computers to:
perform initial cell search based on wideband synchronization signals transmitted by cells in a wireless communication system, wherein the wideband synchronization signals comprise secondary synchronization signals and the instructions cause the one or more computers to detect for the secondary synchronization signals based on pseudo-random sequences for a set of possible cell identifiers (IDs); and
perform neighbor cell search based on narrowband beacon signals transmitted by the cells, wherein the instructions cause the one or more computers to detect for the narrowband beacon signals based on a set of beacon hopping patterns for the set of possible cell IDs.

30. The computer program product of claim 29, wherein the instructions further cause the one or more computers to:
receive the wideband synchronization signals from a fixed portion of system bandwidth; and
receive the narrowband beacon signals from different subcarriers in different symbol periods in which the narrowband beacon signals are transmitted.

31. The computer program product of claim 29, wherein the narrowband beacon signals are signals in which all or a large fraction of total cell transmit power is used for one or a few subcarriers.

32. The computer program product of claim 29, wherein the wideband synchronization signals comprise primary synchronization signals, and the instructions further cause the one or more computers to:
detect for cells during initial cell search based on the primary synchronization signals transmitted by the cells.

\* \* \* \* \*